(12) United States Patent
Nomura et al.

(10) Patent No.: US 7,391,003 B2
(45) Date of Patent: Jun. 24, 2008

(54) APPARATUS AND METHOD FOR ADJUSTING WRITE START POSITION OF A SCANNING LIGHT BEAM OF AN IMAGE FORMING APPARATUS

(75) Inventors: Yujiro Nomura, Nagano-ken (JP); Akihiro Gomi, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/401,213

(22) Filed: Apr. 10, 2006

(65) Prior Publication Data

US 2006/0243886 A1 Nov. 2, 2006

(30) Foreign Application Priority Data

May 2, 2005 (JP) ............................. 2005-133842

(51) Int. Cl.
*H01L 27/00* (2006.01)
(52) U.S. Cl. ...................... 250/208.1; 250/235
(58) Field of Classification Search ............. 250/208.1, 250/234, 235; 358/489, 443, 444, 494; 347/261, 347/243, 259; 359/216, 217, 208, 219
See application file for complete search history.

(56) References Cited

U.S. PATENT DOCUMENTS

| | | | | |
|---|---|---|---|---|
| 4,814,791 A | 3/1989 | Ohara et al. | ................. | 346/108 |
| 4,996,540 A | 2/1991 | Motoi et al. | ................. | 346/108 |
| 5,880,766 A | 3/1999 | Murakami et al. | .......... | 347/236 |
| 5,930,019 A | 7/1999 | Suzuki et al. | ................ | 359/204 |
| 6,038,051 A | 3/2000 | Suzuki et al. | ................ | 359/204 |
| 6,172,788 B1 | 1/2001 | Suzuki et al. | ................ | 359/204 |
| 6,756,583 B2 * | 6/2004 | Yamawaki | ................... | 250/234 |
| 6,844,951 B2 | 1/2005 | Cannon et al. | ............... | 359/223 |
| 2005/0281571 A1 | 12/2005 | Nomura et al. | ............... | 399/49 |

FOREIGN PATENT DOCUMENTS

| | | |
|---|---|---|
| EP | 0326411 | 8/1989 |
| JP | 59-075760 | 4/1984 |
| JP | 63-102545 | 5/1988 |
| JP | 05-276336 | 10/1993 |
| JP | 07-151986 | 6/1995 |
| JP | 08-136838 | 5/1996 |
| JP | 09-085988 | 3/1997 |
| JP | 09-193449 | 7/1997 |
| JP | 10-232357 | 2/1998 |
| JP | 2003-025629 | 1/2003 |
| JP | 09-193463 | 7/2007 |

* cited by examiner

*Primary Examiner*—Que T Le
(74) *Attorney, Agent, or Firm*—Hogan & Hartson LLP

(57) ABSTRACT

An image forming apparatus includes a latent image forming unit in which a light beam scans in a second scan region wider than a first scan region. The light beam is modulated in accordance with an image signal within the range of the first scan region for every scanning cycle and guided onto the effective image region to form a line latent image. A write timing adjuster adjusts a write start position for writing a latent image along the main scanning direction, based on a time difference between a first detection signal output when a first light beam scanning away from the effective image region moves passed an optical sensor, and a second detection signal output when a second light beam scanning toward the effective image region moves passed the optical sensor.

13 Claims, 14 Drawing Sheets

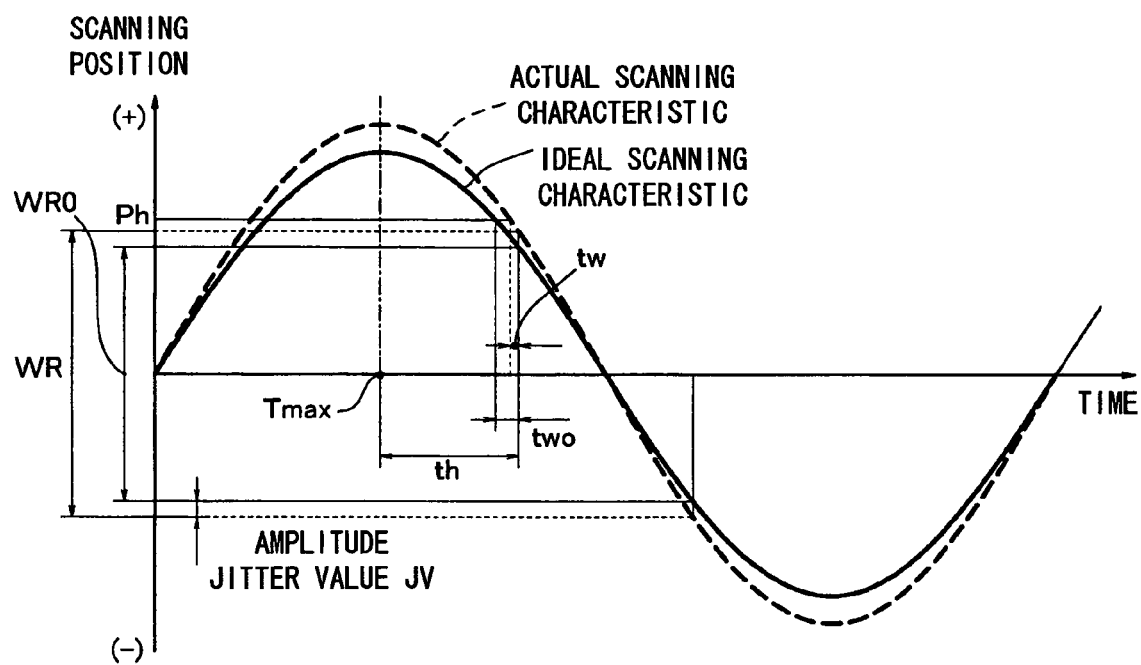

FIG. 7

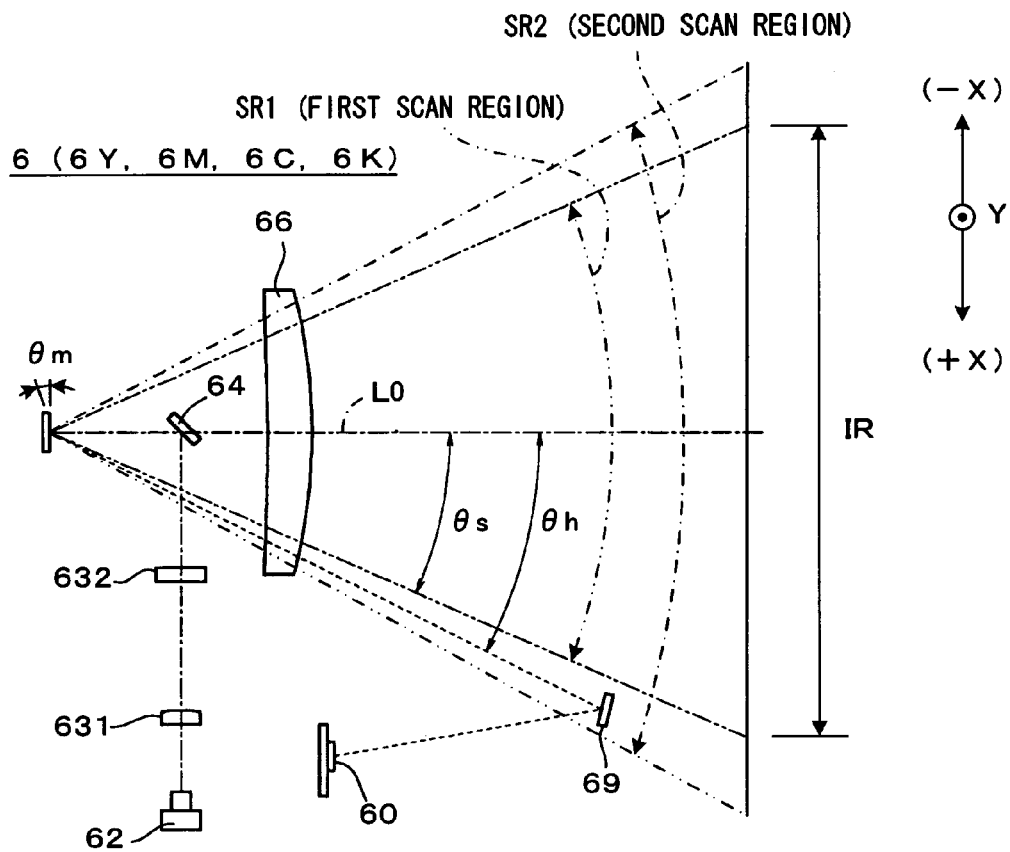

FIG. 8

| ITEM | SYMBOL | VALUE | UNIT |
|---|---|---|---|
| MAXIMUM SWING ANGLE OF DEFLECTING MIRROR SURFACE | $\theta_m$ | 18 | ° |
| EFFECTIVE SCANNING ANGLE | $\theta_s$ | 25 | ° |
| HORIZONTAL SYNCHRONIZATION SCANNING ANGLE | $\theta_h$ | 28 | ° |
| OSCILLATION FREQUENCY OF DEFLECTOR | $f_s$ | 4 | kHz |
| WIDTH OF EFFECTIVE IMAGE REGION | L | 300 | mm |
|  |  |  |  |
| STANDARD HORIZONTAL SYNCHRONIZATION PERIOD | $t_{a0}$ | 54.087 | $\mu s$ |
| STANDARD HORIZONTAL SYNCHRONIZATION STAND-BY TIME | $t_{w0}$ | 4.913 | $\mu s$ |
| WRITE TIME | $t_v$ | 61.087 | $\mu s$ |

FIG. 12

| | DEVIATION IN HORIZONTAL SYNCHRONIZATION PERIOD [ns] | | | | | | |
|---|---|---|---|---|---|---|---|
| | -30 | -20 | -10 | 0 | 10 | 20 | 30 |
| OFFSET VALUE ΔL [μm] -100 | 4.878 | 4.883 | 4.888 | 4.893 | 4.898 | 4.903 | 4.908 |
| -50 | 4.888 | 4.893 | 4.898 | 4.903 | 4.908 | 4.913 | 4.918 |
| 0 | 4.898 | 4.903 | 4.908 | 4.913 | 4.918 | 4.923 | 4.928 |
| 50 | 4.908 | 4.913 | 4.918 | 4.923 | 4.928 | 4.933 | 4.938 |
| 100 | 4.918 | 4.923 | 4.928 | 4.933 | 4.938 | 4.943 | 4.948 |

DEVIATION IN HORIZONTAL SYNCHRONIZATION PERIOD: $t_a - t_{a0}$

OFFSET VALUE ΔL : VALUE FOR FINELY ADJUSTING WRITE START POSITION ALONG MAIN SCANNING DIRECTION (FOR ADJUSTMENT OF COLOR DEVIATION)

FIG. 13

| | HORIZONTAL SYNCHRONIZATION PERIOD ta[μs] | | | | | | |
|---|---|---|---|---|---|---|---|
| | 54.057 | 54.067 | 54.077 | 54.087 | 54.097 | 54.107 | 54.117 |
| OFFSET VALUE ΔL [μm] -100 | 4.878 | 4.883 | 4.888 | 4.893 | 4.898 | 4.903 | 4.908 |
| -50 | 4.888 | 4.893 | 4.898 | 4.903 | 4.908 | 4.913 | 4.918 |
| 0 | 4.898 | 4.903 | 4.908 | 4.913 | 4.918 | 4.923 | 4.928 |
| 50 | 4.908 | 4.913 | 4.918 | 4.923 | 4.928 | 4.933 | 4.938 |
| 100 | 4.918 | 4.923 | 4.928 | 4.933 | 4.938 | 4.943 | 4.948 |

OFFSET VALUE ΔL : VALUE FOR FINELY ADJUSTING WRITE START POSITION ALONG MAIN SCANNING DIRECTION (FOR ADJUSTMENT OF COLOR DEVIATION)

F I G. 1 5
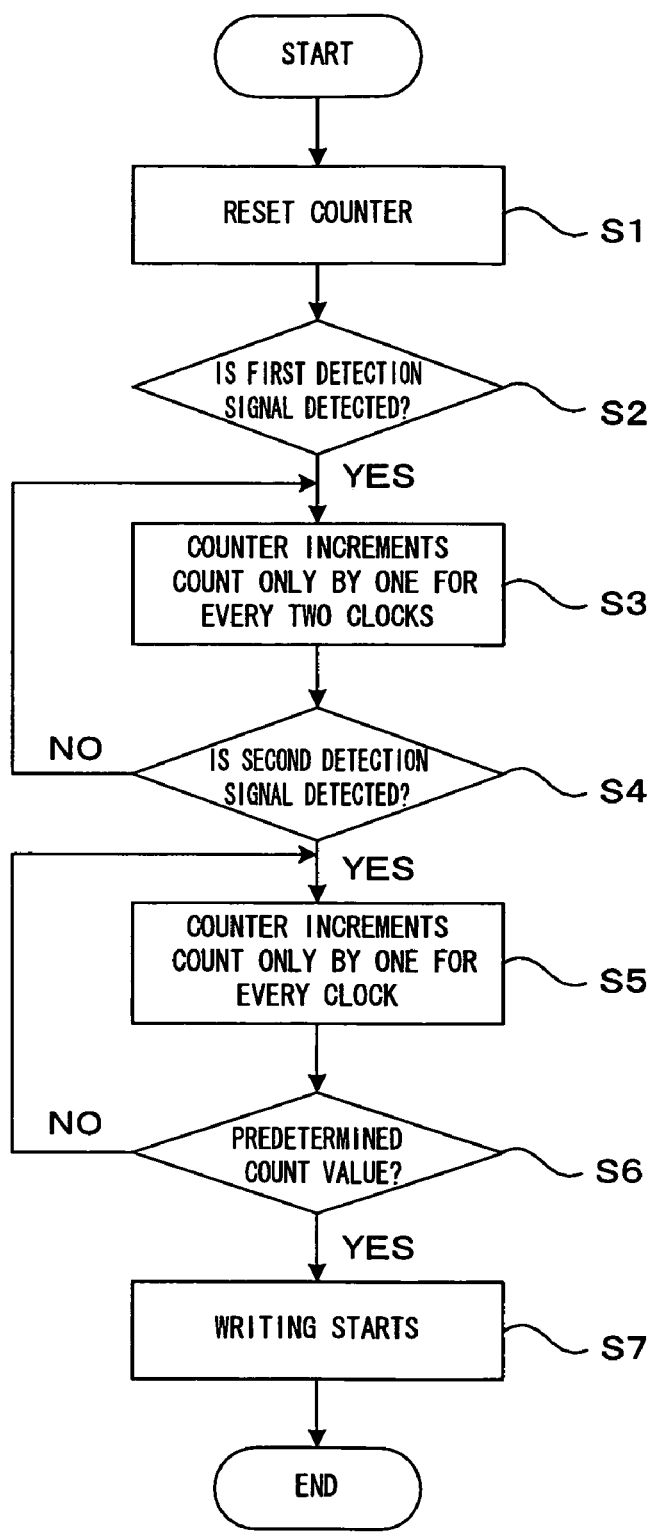

FIG. 19A : FORMING OF LINE LATENT IMAGE WITH LIGHT BEAM ALONG FIRST DIRECTION
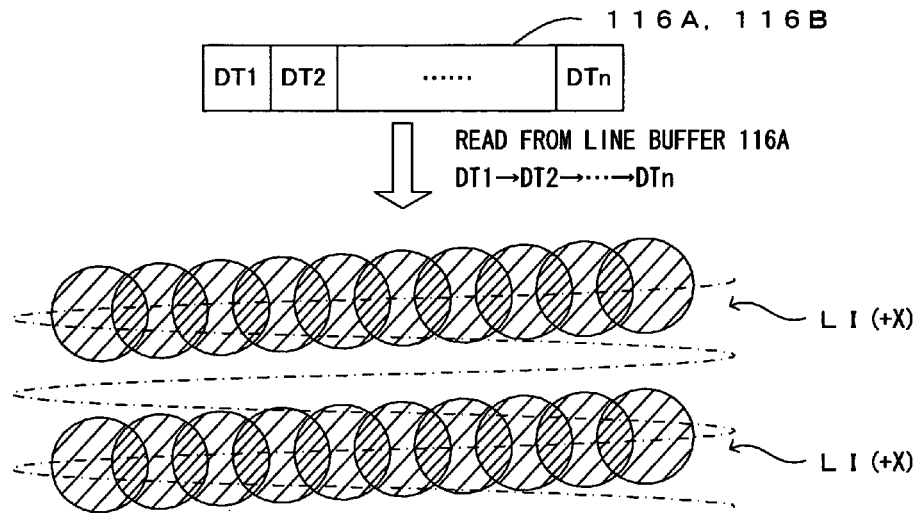
FIG. 19B : FORMING OF LINE LATENT IMAGE WITH LIGHT BEAM ALONG SECOND DIRECTION
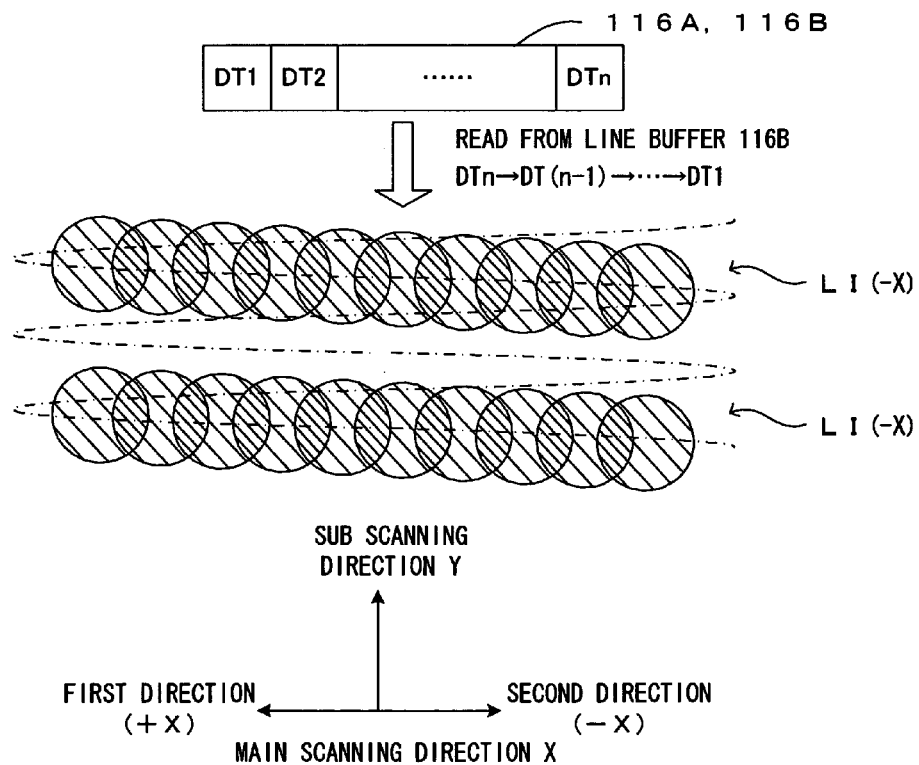

APPARATUS AND METHOD FOR ADJUSTING WRITE START POSITION OF A SCANNING LIGHT BEAM OF AN IMAGE FORMING APPARATUS

CROSS REFERENCE TO RELATED APPLICATION

The disclosure of Japanese Patent Application No. 2005-133842 filed May 2, 2005 including specification, drawings and claims is incorporated herein by reference in its entirety.

BACKGROUND

1. Technical Field

The present invention relates to an image forming apparatus and an image forming method wherein a deflecting mirror surface makes a light beam from a light source scan over an effective image region of a latent image carrier and a latent image is formed in this effective image region.

2. Related Art

In a conventional apparatus, a deflecting mirror surface of a resonant scanner deflects a light beam emitted from a light source, the light beam scans over a latent image carrier such as a photosensitive drum, and a line latent image is formed. In the image forming apparatus described in JP-A-2003-25629 for instance, a semiconductor laser is used as a light source and the semiconductor laser emits a light beam whose optical intensity corresponds to an image signal. After deflected by the deflecting mirror surface of the resonant scanner, the light beam thus optically modulated is guided onto a photosensitive drum and scans over the surface of the photosensitive drum. As a result, a latent image corresponding to the image signal is formed on the photosensitive drum.

Further, a beam detector formed by light receiving diodes is disposed next to the photosensitive drum and detects an area near the end of the light beam scanning region. A horizontal synchronizing signal generator circuit generates a horizontal synchronizing signal based on an output from the beam detector, and modulation of the light beam is controlled in synchronization to the horizontal synchronizing signal. This adjusts a write start position at which writing of a line latent image starts.

SUMMARY

However, an image forming apparatus in which an oscillation mirror which may be a resonant scanner serves as a deflector may give rise to amplitude jitters. Amplitude jitters are the phenomenon that the amplitude of a deflecting mirror surface changes. When amplitude jitters are created, the scanning width may change and the scanning position at the end of scanning region may fluctuate for every scanning. The timing of outputting a signal from a sensor (beam detector) which is disposed, as in a conventional structure, near the end of the beam scanning region may therefore change and the timing of start modulating the light beam may therefore change for every scanning. The change of the modulation timing due to amplitude jitters will change an image write start position along a main scanning direction. In consequence, the contour of a linear line extending along a sub scanning direction which is approximately orthogonal to the main scanning direction may therefore be disturbed or an image screen may therefore be disturbed, leading to banding. In this manner, an image forming apparatus which forms a latent image using an oscillating deflection mirror surface has a major problem of a deteriorated image quality attributable to amplitude jitters.

An advantage of some aspects of the invention is to suppress an adverse influence of amplitude jitters over a latent image and form a high-quality image in an image forming apparatus which makes an oscillating deflection mirror surface scan a light beam along a main scanning direction and forms a latent image on a latent image carrier.

According to an aspect of the invention, an image forming apparatus comprises: a latent image carrier that includes an effective image region which has a predetermined width along a main scanning direction; a latent image forming unit that has a structure in which a deflection mirror surface makes a light beam scan in a second scan region which is wider than a first scan region which corresponds to the effective image region, that modulates the light beam in accordance with an image signal within the range of the first scan region for every scanning cycle, and that guides the modulated light beam onto the effective image region, thereby forming a line latent image which corresponds to the image signal; an optical sensor that detects a scanning light beam, which moves outside the first scan region within the second scan region, to output a signal; and a write timing adjuster that controls the timing of start modulating the light beam and accordingly adjusts a write start position for start writing a latent image along the main scanning direction, based on a time difference between a first detection signal, which the optical sensor outputs as a first light beam scanning away from the effective image region moves passed the optical sensor, and a second detection signal, which the optical sensor outputs after outputting the first detection signal when a second light beam scanning toward the effective image region moves passed the optical sensor.

According to another aspect of the invention, an image forming method for use in an image forming apparatus which comprises a latent image carrier that includes an effective image region which has a predetermined width along a main scanning direction, and a latent image forming unit that has a structure in which a deflection mirror surface makes a light beam scan in a second scan region which is wider than a first scan region which corresponds to the effective image region, that modulates the light beam in accordance with an image signal within the range of the first scan region for every scanning cycle, and that guides the modulated light beam onto the effective image region, thereby forming a line latent image which corresponds to the image signal. The image forming method comprises: making an optical sensor detect a first light beam which scans and moves away from the effective image region; making a second light beam scan and move toward the effective image region after the first light beam, as a result of inversion of the deflection mirror surface; making the optical sensor detect the second light beam; calculating the elapsed time since detection of the first light beam until detection of the second light beam; and controlling the timing of start modulating the second light beam based on the elapsed time, thereby adjusting a write start position for start writing a latent image along the main scanning direction.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6 is a schematic diagram which illustrates basic concept of the invention;

FIG. 7 is a drawing which shows an exposure unit in the image forming apparatus according to the first embodiment of the invention;

FIG. 8 shows a table of the specification of an optical system which forms the exposure unit which is shown in FIG. 7;

FIGS. 12 and 13 are drawings which show a data table of the horizontal synchronization stand-by times;

FIG. 15 is a flow chart which shows a method of determining the timing of start modulating a light beam according to the fifth embodiment;

FIGS. 19A and 19B show line latent images which are formed by the apparatus in FIG. 17.

DESCRIPTION OF EXEMPLARY EMBODIMENTS

The invention is directed to an image forming apparatus and an image forming method according to which a deflecting mirror surface makes a light beam from a light source scan over an effective image region of a latent image carrier and a latent image is formed in this effective image region. The structure of an apparatus to which the invention is applicable will now be schematically described, followed by a detailed description on the basic concept of the invention and particular embodiments.

Basic Structure of the Invention

Figure 1:
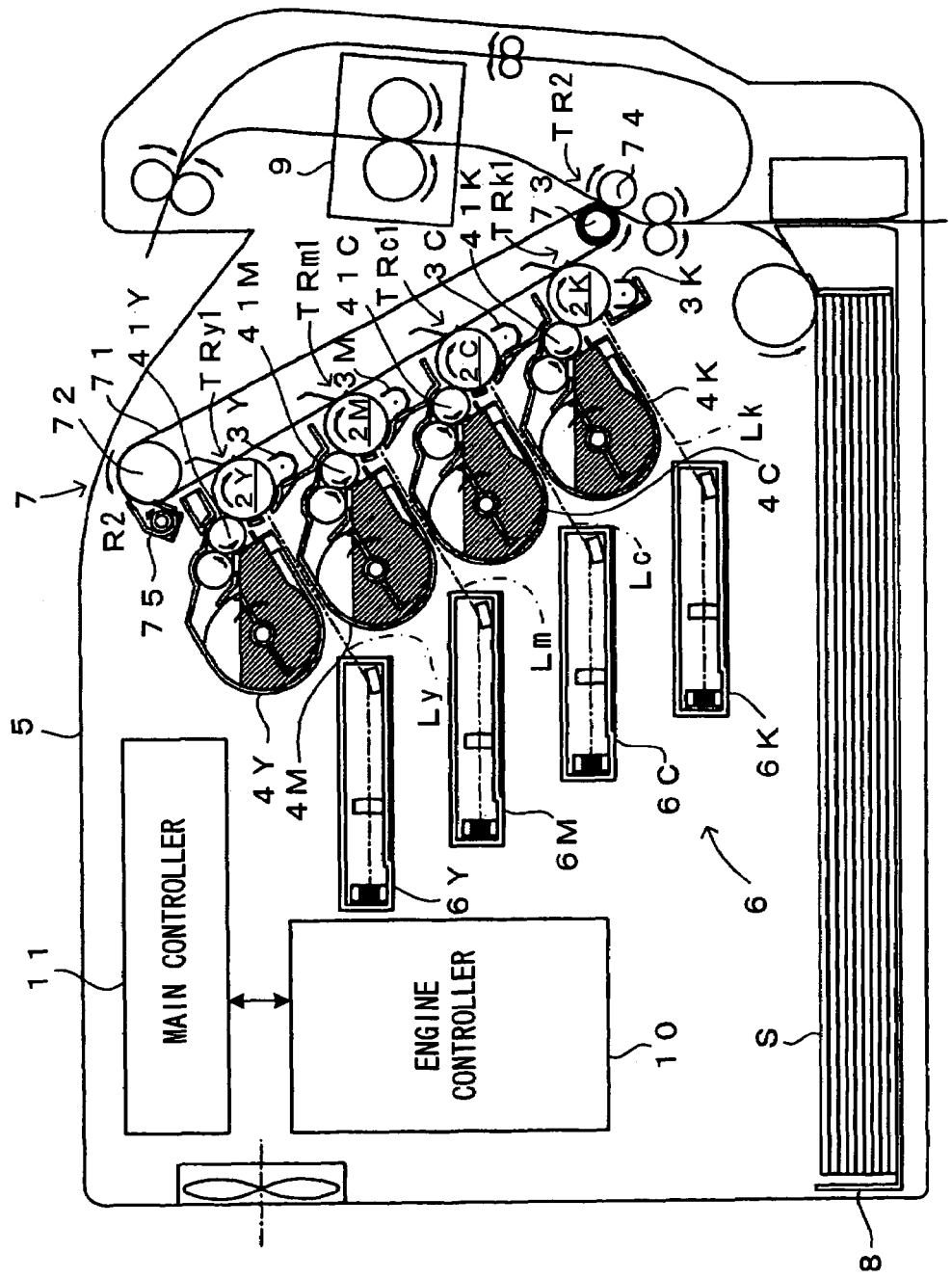
FIG. 1 is a diagram showing an image forming apparatus according to a first embodiment of the invention.
Figure 2:
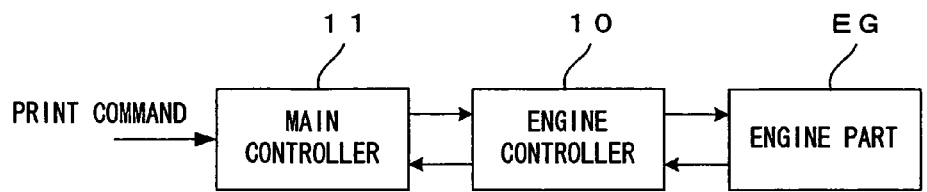
FIG. 2 is a block diagram showing an electrical arrangement of the image forming apparatus of FIG. 1.

FIG. 1 is a diagram showing an image forming apparatus according to a first embodiment of the invention. FIG. 2 is a block diagram showing an electrical arrangement of the image forming apparatus of FIG. 1. This image forming apparatus is a so-called tandem color printer wherein photosensitive members 2Y, 2M, 2C, 2K for four colors of yellow Y, magenta M, cyan C and black K, as latent image carriers, are juxtaposed in an apparatus body 5. The apparatus is adapted to form a full-color image by superimposing toner images on the individual photosensitive members 2Y, 2M, 2C, 2K, or to form a monochromatic image using only the toner image of black (K). The image forming apparatus operates as follows. When an external apparatus such as a host computer applies an image forming command to a main controller MC in response to a request from a user wanting to form an image, the main controller MC sends image signals, a reference signal, control signals and the like. In response to the signals from the main controller MC, individual parts of an engine section EG operate to form the image corresponding to the image forming command on a sheet S such as copy sheet, transfer sheet, paper and transparent sheet for OHP.

In the engines EG, charger units, developing units, exposure units and cleaners are provided in correspondence to respective ones of the four photosensitive members 2Y, 2M, 2C, and 2K. Thus, the photosensitive member, the charger unit, the developing unit, the exposure unit and the cleaner are provided on a per-toner-color basis, thereby constituting an image forming unit for forming a toner image of each corresponding toner color. An engine controller 11 disposed in the engine section EG controls individual parts of the image forming units according to signals from the main controller MC, so as to carry out image formation. It is noted here that these image forming units (the photosensitive members, charger units, developing units, exposure units and cleaners) for the respective color components are arranged the same way. Therefore, the arrangement for the yellow color component is described here while individual parts of the arrangements for the other color components are represented by equivalent reference characters, respectively, and the description thereof is dispensed with.

The photosensitive member 2Y is arranged to be rotatable in a direction of an arrow in FIG. 1 (sub-scan direction). A charger unit 3Y, a developing unit 4Y and a cleaner (not shown) are arranged around the photosensitive member 2Y along the rotational direction. The charger unit 3Y comprises a scorotron charger, for example, which is applied with a charging bias from the engine controller 11 thereby uniformly charging an outside surface of the photosensitive member 2Y to a predetermined surface potential. An exposure unit 6Y emits a scan light beam Ly toward the outside surface of the photosensitive member 2Y so charged by the charger unit 3Y Thus, an electrostatic latent image corresponding to yellow image data included in the image forming command is formed on the photosensitive member 2Y The exposure unit 6Y corresponds to the "latent image forming unit" of the present invention. Arrangements and operations of the exposure unit 6 (6Y, 6M, 6C, 6K) and a control unit (drive signal controlling section 10 and mirror controlling section 11) for controlling the exposure unit will be described in details hereinlater.

The electrostatic latent image thus formed is developed with toner by means of the developing unit 4Y The developing unit 4Y contains therein a yellow toner. When the engine controller 11 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: an intermediate transfer belt 71 entrained about two rollers 72, 73; and a belt driver (not shown) operative to drive the roller 72 into rotation thereby rotating the intermediate transfer belt 71 in a predetermined rotational direction R2. The transfer unit 7 is further provided with a secondary transfer roller 74 which confront the roller 73 with the intermediate transfer belt 71 interposed therebetween and which is adapted to be moved into contact with or away from a surface of the belt 71 by means of an unillustrated electromagnetic clutch. In a case where a color image is transferred to the sheet S, primary transfer timings are controlled to superimpose the individual toner images on each other thereby to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred onto the sheet S, on the other hand, only a black toner image is formed on the photosensitive member 2K and the monochromatic image is secondarily transferred onto the sheet S delivered to the secondary transfer region TR2. The sheet S thus secondarily transferred with the image is transported to a discharge tray at a top surface of the apparatus body via a fixing unit 9.

After the primary transfer of the toner images to the intermediate transfer belt 71, the photosensitive members 2Y, 2M, 2C, 2K have their the surface potentials reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, and 3K.

Figure 9:
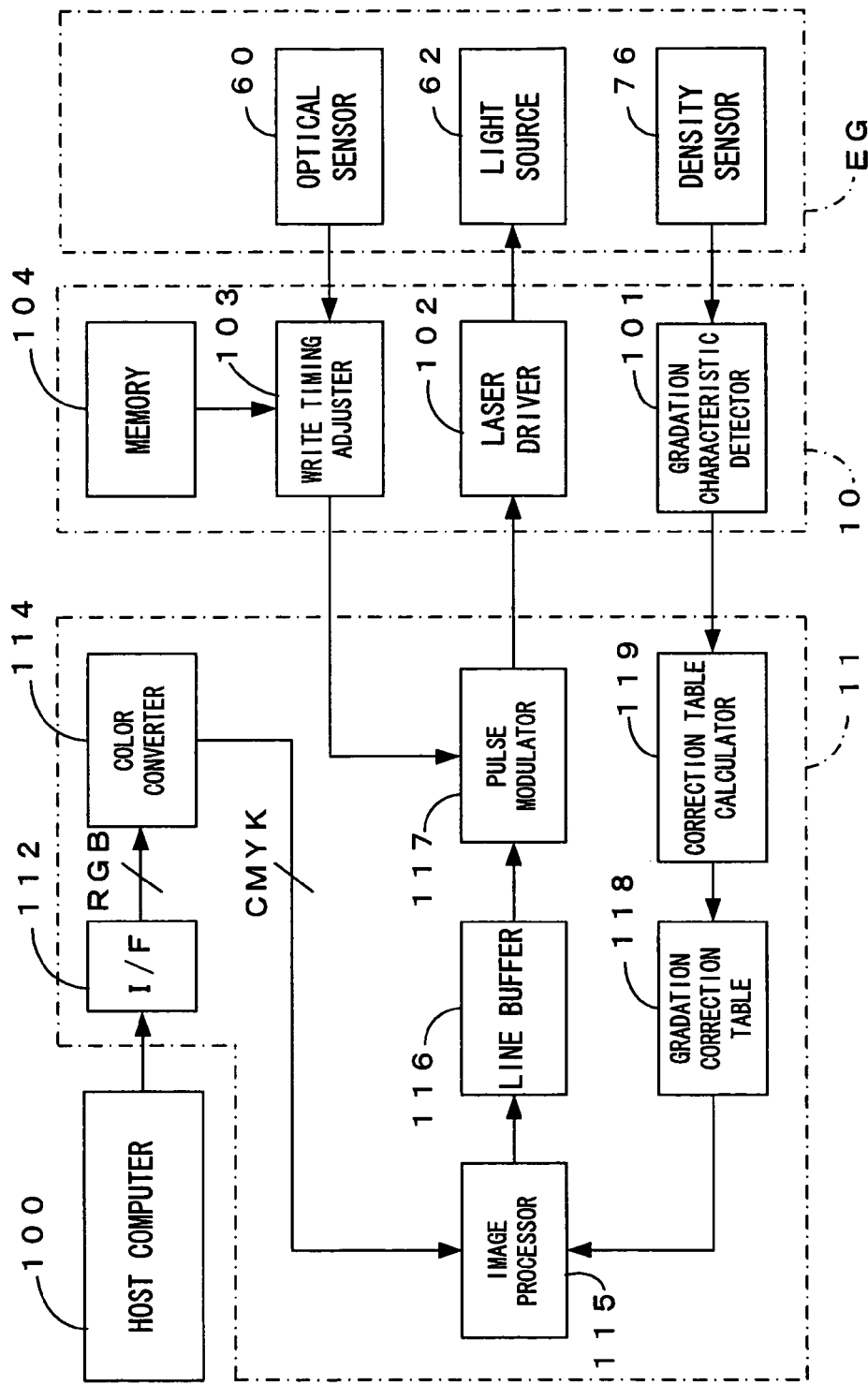
FIG. 9 is a block diagram of an electric structure related to writing of an image in the first embodiment.

Disposed in the vicinity of the roller 72 are a transfer belt cleaner 75 and a density sensor (denoted at 76 in FIG. 9). The cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer. The density sensor 76 is disposed facing the surface of the intermediate transfer belt 71 and measures the optical densities of patch images formed on the outer circumferential surface of the intermediate transfer belt 71.

Figure 3:
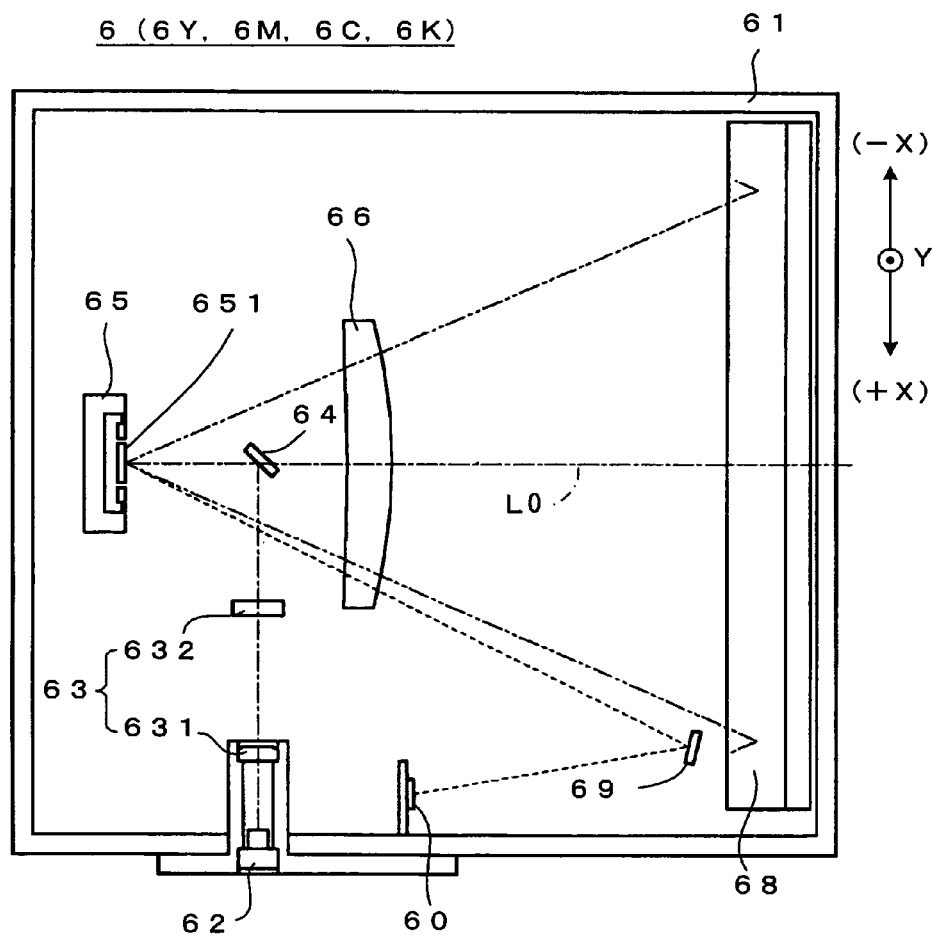
FIG. 3 is a sectional view taken on a main-scan direction for showing an arrangement of the exposure unit provided in the image forming apparatus of FIG. 1.

FIG. 3 is a sectional view taken on a main-scan direction for showing an arrangement of the exposure unit provided in the image forming apparatus of FIG. 1. The exposure unit 6Y (6M, 6C, 6K) includes an exposure casing 61. The exposure casing 61 has a single exposure light source 62 fixed thereto so as to be capable of emitting a light beam from the laser light source 62. The laser light source 62 is ON/OFF controlled based on this image signal, so that the laser light source 62 emits a light beam Ly modulated according to the image signal. Further, as described later, ON/OFF of the laser source 62 is controlled at the edges of a scanning area for controlling timing of write start, which also results in forward emission of the light beam from the laser source 62.

Within the exposure casing 61, there are provided a collimator lens 631, a cylindrical lens 632, a deflector 65 and a scanning lens 66 for scanning the light beam from the laser light source 62 on the surface of the photosensitive member 2Y. Specifically, the light beam from the laser light source 62 is shaped into a collimated beam of a suitable size by means of the collimator lens 631 and then, is made incident on the cylindrical lens 632 powered only in a sub-scan direction Y By adjusting the cylindrical lens 631, the collimated beam is focused onto place near a deflecting mirror surface 651 of the deflector 65 with respect to the sub-scan direction Y According to the embodiment, a combination of the collimator lens 631 and the cylindrical lens 632 functions as a beam shaping system 63 for shaping the light beam from the laser light source 62. In this optical scanning apparatus, a mirror 64 is disposed between beam shaping system 63 and the deflector 65 to form an oblique incidence structure. For detail, the laser beam emitted from the laser light source 62 is shaped and then reflected by the reflecting mirror 64. The reflected light beam is incident upon the deflection mirror surface so as to form at an acute angle with respect to a reference plane which is orthogonal to a pivot axis (normal to the surface of FIG. 3).

The deflector 65 is formed using a micromachining technique which applies a semiconductor fabrication technique in integrally forming micro machines on a semiconductor substrate. The deflector comprises an oscillation mirror adapted for resonant oscillations. Specifically, the deflector 65 is capable of deflecting the light beam in a main-scan direction X by means of the deflecting mirror surface 651 in resonant oscillations. More specifically, the deflecting mirror surface 651 is carried in a manner to be oscillatble about an oscillatory axis (torsion spring) extending substantially perpendicular to the main-scan direction. The deflective mirror oscillates about the oscillatory axis according to an external force applied from an operating section 652. The operating section 652 applies an electrostatic, electromagnetic or mechanical external force to the deflecting mirror surface 651 based on a mirror drive signal from a mirror driver 111 of the mirror controlling section 11Y, thereby causing the deflecting mirror surface 651 to oscillate at a frequency of the mirror drive signal. The operating section 652 may adopt any of the drive methods based on electrostatic attraction, electromagnetic force and mechanical force. These drive methods are known in the art and hence, the description thereof is dispensed with.

Figure 4:
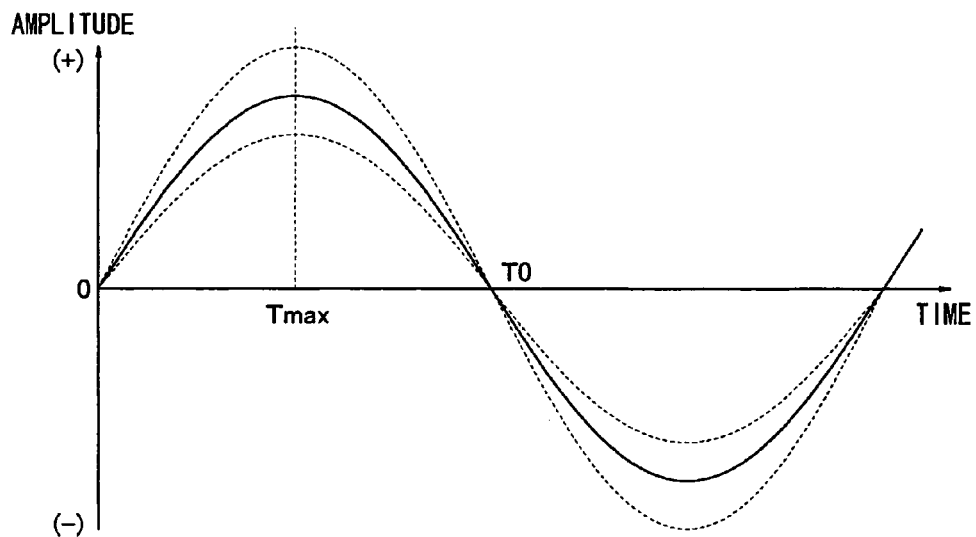
FIG. 4 shows an amplitude jitter characteristic of a deflecting mirror surface using in the apparatus.

The light beam deflected by the deflecting mirror surface 651 of the deflector 65 is directed toward the scanning lens 66. The deflected light beam passes through the scanning lens 66 and is reflected by the mirror 68 to be focused onto the effective scan region on the photosensitive member 2. Thus, the light beam scans in parallel to the main scanning direction X so as to form a linear latent image in the effective image region IR on the photosensitive member 2, the linear latent image extending in the main scanning direction X. In addition, in this embodiment, a scan region ("second scan region" of the invention) SR2, which can be scanned by the deflector 65, is broader than a scan region ("first scan region" of the invention) SR1 where the light beam scans in the effective image region IR, as shown in FIG. 4. Further, the first scan region SR1 is positioned approximate center of the second scan region SR2, so as to be approximately symmetrical with respect to an optical axis.

As shown in FIG. 3, a reflective mirror 69 is disposed on one side in the scanning direction and guides the scanning light beam at the end of the scanning path toward a optical sensor 60. More specifically, the reflective mirror 69 is disposed at the end of the second scan region SR2. The reflective mirror 69 guides the scanning light beam which moves inside the second scan region SR2 and outside the first scan region SR1 toward the sensor 60. At a time when the scanning light beam is received by the sensor 60 and passes at a sensor position, the sensor 60 outputs a signal.

Basic Concept of the Invention

Amplitude jitters of the deflector 65 having the structure above were verified, which identified an amplitude jitter characteristic as that shown in FIG. 4. In the case of the deflector 65, even when the amplitude changes, neither a maximum amplitude time Tmax at which the amplitude becomes the largest nor an amplitude zero time T0 at which the amplitude becomes zero changes.

When conventional horizontal synchronous control is exercised in an apparatus in which the deflector 65 exhibiting an amplitude jitter characteristic as that shown in FIG. 4 makes a light beam scan, amplitude jitters change a write start position at which writing of a latent image starts along the main scanning direction. In other words, according to the conventional technique, a signal which is output from an optical sensor 60 when the scanning light beam moves passed the optical sensor 60, is used directly as a horizontal synchronizing signal. On the basis of the signal, the timing of start modulating the light beam is controlled using this horizontal synchronizing signal, and the write start position for an image is determined. For instance, in an apparatus designed on the premise that the waveform denoted at the solid line in FIG. 5 expresses an ideal scanning characteristic (the state of an ideal amplitude), the scanning light beam moves passed the optical sensor 60 and the optical sensor 60 outputs the signal at the timing T1. After a predetermined period of time tw0 since outputting of the signal (standard horizontal synchronization stand-by time), modulation of the light beam starts (timing T2). This determines the write start position at which writing of a latent image starts along the main scanning direction. Following this, during a write time tv set in advance, turning on and off of a laser light source 62 is controlled in accordance with an image signal received from a main controller 11, and a latent image is formed in an effective image region of a photosensitive member 2. This latent image forming region serves as an ideal write region WR0 within the effective image region.

Figure 5:
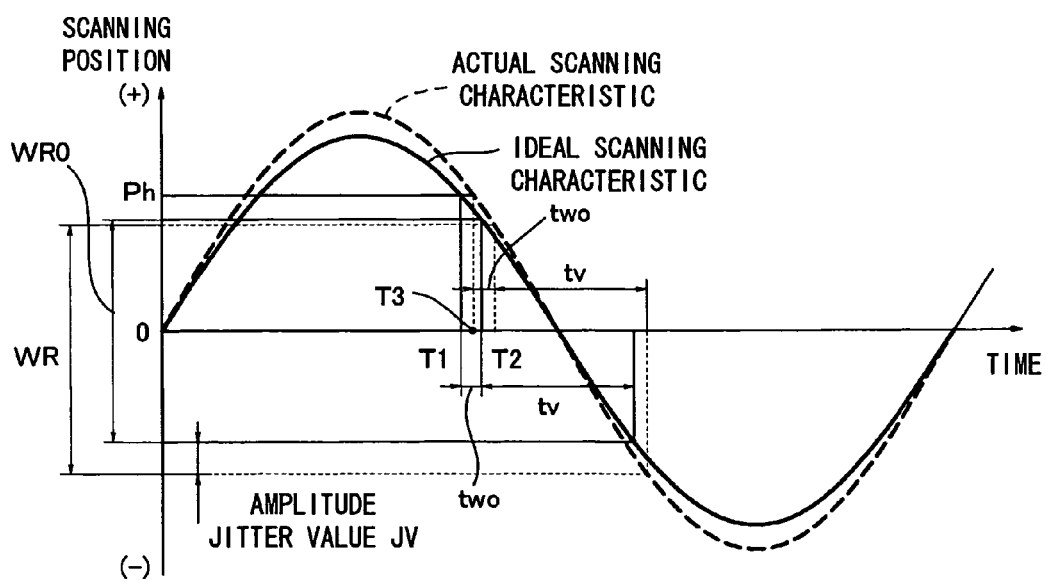
FIG. 5 is a schematic diagram which illustrates a problem occurring in the conventional horizontal synchronous control.

However, if the amplitude of the deflector 65 changes and the scanning characteristic consequently changes to one expressed by the waveform denoted at the broken line in FIG. 5, the timing at which the scanning light beam moves passed the optical sensor 60 changes from the timing T1 to the timing T3. In a conventional apparatus, modulation of the light beam starts after the standard horizontal synchronization stand-by time tw0 since the timing T3. Therefore, the write start position at which writing of a latent image starts along the main scanning direction slightly changes toward a direction which corresponds to a direction of a change of the amplitude (i.e., toward the minus direction in FIG. 5 as the amplitude increases) from the write start position as it is in an ideal state. Further, turning on and off of the laser light source 62 is controlled in accordance with an image signal received from the main controller 11 during a period from the timing T3 until the time tv and a latent image is consequently formed in the effective image region of the photosensitive member 2. Thus, this latent image forming region expands or shrinks in the direction corresponding to the direction of a change of the amplitude and becomes the write region WR within the effective image region. In FIG. 5, as the amplitude increases, the write region WR expands. As a result, although the amount of deviation of the write start position is relatively small on the write start side (the plus side in FIG. 5), the amount of deviation is large on the write end side (the minus side in FIG. 5). This is the deviation of the position attributable to amplitude jitters and the maximum value of the amount of deviation is an amplitude jitter value JV. The quality of an image thus greatly deteriorates due to the amplitude jitters where the output signal from the optical sensor 60 is used directly as the horizontal synchronizing signal and the timing of start modulating the light beam is controlled using the horizontal synchronizing signal.

The inventors of the invention, in an effort to suppress the adverse influence of amplitude jitters, studied various possibilities and discovered that one of effective suppression methods was control of the timing of start modulating a light beam based on the maximum amplitude time Tmax. That is, in the case of the deflector 65 exhibiting an amplitude jitter characteristic as that shown in FIG. 4, the maximum amplitude time Tmax rarely changes even despite a change of the amplitude as described above. Hence, control of the timing of start modulating a light beam based on the maximum amplitude time Tmax is one of effective ways to suppress an adverse influence of amplitude jitters. Describing in more specific details, as shown in FIG. 6, the horizontal synchronization stand-by time tw at which modulation of the light beam starts and writing starts is adjusted. The adjustment of the time tw achieves a change in the period of time until the start of modulation of the light beam since a second light beam moved passed the optical sensor 60 and a second detection signal was output, whereby the period of time between the maximum amplitude time Tmax and the time of start writing is a certain period of time th. Hence, as shown in FIG. 6, the write region WR overlaps the ideal write region WR0 about the center-of-scan position at which an optical axis L0 intersects the photosensitive member 2, thereby approximately coinciding the amount of deviation on the write start side with the amount of deviation on the write end side. This suppresses the amplitude jitter value JV down to approximately half that in a conventional apparatus.

Noting this, for the purpose of start modulating the light beam after the period of time th since the maximum amplitude time Tmax, this embodiment requires controlling the timing of start modulating the light beam based on two detection signals which the optical sensor 60 outputs continuously as the light beam reciprocally scans. In other words, the timing of start modulating the light beam is controlled based on a first detection signal and a second detection signal. The first detection signal is output from the optical sensor 60 when a first light beam moving away from the effective image region moves passed the optical sensor 60. The second detection signal is output from the optical sensor 60, after outputting the first detection signal, when a second light beam moving toward the effective image region moves passed the optical sensor 60. This will now be described in detail with reference to specific examples.

EMBODIMENTS

FIG. 7 is a drawing which shows an exposure unit in the image forming apparatus according to the first embodiment of the invention. FIG. 8 shows a table of the specification of an optical system which forms the exposure unit which is shown in FIG. 7. FIG. 9 is a block diagram of an electric structure related to writing of an image in the first embodiment. As shown in these drawings, in the image forming apparatus according to the first embodiment, upon receipt of a print command from an external apparatus such as a host computer 100, a main controller 11 performs predetermined signal processing of image data corresponding to the print command. The main controller 11 comprises functional blocks such as a color converter 114, an image processor 115, a line buffer 116, a pulse modulator 117, a gradation correction table 118 and a correction table calculator 119.

Meanwhile, an engine controller 10 comprises a gradation characteristic detector 101 which detects a gradation characteristic which is indicative of a gamma characteristic of an engine section EG based on the result of detection performed by a density sensor 76. In the main controller 11 and the engine controller 10, these functional blocks may be realized by hardware, or alternatively, by software which is executed by a CPU not shown.

In the main controller 11 which has received the print command from the host computer 100, the color converter 114 converts RGB gradation data expressing the gradation levels of RGB components of each pixel within an image which corresponds to the print command into CMYK gradation data expressing the associated gradation levels of CMYK components. In the color converter 114, input RGB gradation data are 8-bit data per color component per pixel (which express 256 gradation levels) for instance, and output CMYK gradation data similarly are 8-bit data per color component per pixel (which express 256 gradation levels). The CMYK gradation data output from the color converter 114 are fed to the image processor 115.

The image processor 115 executes the following processing for each color component. That is, the image processor 115 executes gradation correction and half toning of the gradation data regarding each pixel received from the color converter 114. Further, the image processor 115 refers to the gradation correction table 118 registered in advance within a non-volatile memory, and the image processor 115 converts the input gradation data regarding each pixel received from the color converter 114 into corrected gradation data which express corrected gradation levels in accordance with the gradation correction table 118. The purpose of gradation correction is to compensate a change of the gamma characteristic of the engine section EG having the structure above and accordingly maintain the entire gamma characteristic of this image forming apparatus always ideal. In other words, a gamma characteristic is different between individual image forming apparatuses of this type and the gamma characteristic of even the same image forming apparatus changes depending upon how the image forming apparatus is used. Therefore, for removal of an influence of a varying gamma characteristic over the quality of an image, at predetermined timing, gradation control processing is performed which updates the content of the gradation correction table 118 based on the measured density of an image.

During the gradation control processing, for each toner color, the engine section EG forms on an intermediate transfer belt 71 gradation patch images for gradation correction which have been prepared in advance for measurement of the gamma characteristic. The density sensor 76 then reads the densities of the respective gradation patch images. Based on a signal from the density sensor 76, the gradation characteristic detector 101 creates a gradation characteristic (the gamma characteristic of the engine section EG) which correlates the gradation levels of the respective gradation patch images with the detected image densities and outputs the gradation characteristic to the correction table calculator 119 of the main controller 11. Following this, based on a gradation characteristic fed from the gradation characteristic detector 101, the correction table calculator 119 compensates the measured gradation characteristic of the engine section EG; and calculates gradation correction table data which are for acquisition of an ideal gradation characteristic. The calculator 119 further updates the content of the gradation correction table 118 into thus calculated result. The gradation correction table 118 is modified and set in this fashion. This image forming apparatus is therefore capable of forming images of a stable quality despite a variation of the gamma characteristic, a change with time, etc.

The image processor 115 performs half toning, such as error diffusion, dither and screening, of the corrected gradation data thus corrected, and supplies halftone CMYK gradation data which are 8-bit data per pixel per color to the line buffer 116. The gradation data held in the line buffer 116 which is disposed for each color component are fed at appropriate timing to the pulse modulator 117. The content of half toning is different depending upon the type of an image to be formed. In short, in accordance with a criteria such as whether the image is a monochrome image or a color image and whether the image is a line image or a graphic image, the content of processing which is most suitable to the image is selected and executed.

The gradation data as they are after half toned and fed to the pulse modulator 117 denote multi-value signals which are indicative of the size and the sequence of toner dots of each color in which the respective pixels are to be colored. The pulse modulator 117 receives this data, and using this halftone gradation data, the pulse modulator 117 generates an image signal which is for modulating the pulse width of an exposure laser pulse for an image of each color inside the engine section EG and outputs the image signal to the engine controller 10 via a video interface not shown. A laser driver 102 receiving the image signal controls turning on and off of the laser light source 62 of the exposure unit 6, whereby the light beam is modulated.

As shown in FIG. 7, the light beam emitted from the laser light source 62 impinges upon a deflecting mirror surface 651 of the deflector 65 via a beam shaper system 63 (i.e., a collimator lens 631 and a cylindrical lens 632) and a mirror 64. In this embodiment, the deflecting mirror surface 651 is axially supported for free rocking about an oscillation axis (helical spring) which is approximately orthogonal to a main scanning direction X, and resonates in accordance with a mirror drive signal received from a mirror driver (not shown) of the engine controller 10. The maximum swing angle θ m and the oscillation frequency fs of the deflecting mirror surface 651 which rocks in this manner are set as θ m=18° and fs=4 kHz in this embodiment.

The deflecting mirror surface 651 of the deflector 65 resonating in this fashion deflects the light beam toward a scanning lens 66. In this embodiment, the scanning lens 66 is structured such that the F-value is approximately the same across an effective image region IR as a whole of the photosensitive member 2. Hence, the light beam deflected toward the scanning lens 66 is focused via the scanning lens 66 and a mirror 68 as spots having approximately the same diameters in the effective image region IR which is within the surface of the photosensitive member 2. In consequence, the light beam scans parallel to the main scanning direction X, and a line latent image extending along the main scanning direction X is formed on the effective image region IR of the photosensitive member 2 (In this embodiment, the width L of the region IR along the main scanning direction X is set to 300 mm.). In this embodiment, a scan region SR2 which the deflector 65 can scan (i.e., the "second scan region" of the invention) is set wider than a scan region SR1 over which the light beam scans on the effective image region IR (i.e., the "first scan region" of the invention), as shown in FIG. 7. Further, the first scan region SR1 is located approximately at the center of the second scan region SR2 and is approximately symmetric with respect to the optical axis L0. In addition, in FIG. 7, denoted at θ s is a scanning angle which corresponds to an edge portion of the effective image region IR, namely, an effective scanning angle, while denoted at θh is a scanning angle which corresponds to the optical sensor 60, namely, a horizontal synchronization scanning angle. In this embodiment, the effective scanning angle θs and the horizontal synchronization scanning angle θh are θs=25° and θh=28°, respectively.

Further, in this embodiment, on the upstream side (+X) along the scanning direction, a return mirror 69 guides the scanning light beam back to the optical sensor 60 at the end of the scanning route of the scanning light beam. The return mirror 69 is disposed in an end portion of the second scan region SR2 which is located on the upstream side (+X) along the scanning direction, and guides back to the optical sensor 60 the scanning light beam which moves outside the first scan region SR1 within the second scan region SR2 on the upstream side (+X) along the scanning direction. When the optical sensor 60 receives the scanning light beam and the scanning light beam moves passed the sensor location (the horizontal synchronization scanning angle θh) Ph, the optical sensor 60 outputs a signal. In short, the signal which the optical sensor 60 outputs when the scanning light beam (first light beam) traveling away (+X) from the effective image region IR moves passed the sensor location Ph, is the first detection signal. As the deflecting mirror surface 651 turns over, the scanning direction of the scanning light beam is reversed. When the scanning light (second light beam) moves passed the sensor location Ph, the optical sensor 60 outputs another signal which corresponds to the second detection signal. In this manner, the optical sensor 60 outputs the detection signals one before and another after the time Tmax at which the scanning light beam has the maximum amplitude value. The time difference between these successive detection signals corresponds to a horizontal synchronization period ta.

As shown in FIG. 9, the output signals from the optical sensor 60 are fed to a write timing adjuster 103 of the engine controller 10. As described below, the write timing adjuster 103 determines the timing of start modulating the light beam based on a certain period of time th stored in advance within a memory 104 and the horizontal synchronization period ta identified from the output signals from the optical sensor 60, and the write timing adjuster 103 supplies a signal relevant to this timing to the pulse modulator 117 of the main controller 11. This adjusts the write start position on the photosensitive member 2.

Figure 10:
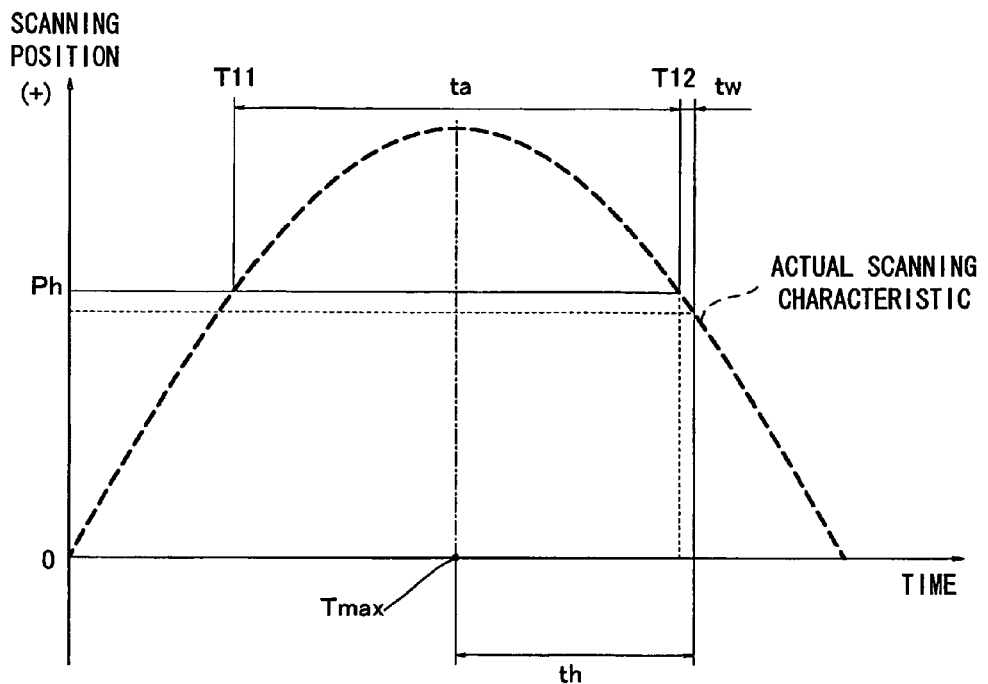
FIG. 10 is a drawing which shows a method of determining the timing of start modulating the light beam according to the first embodiment.

FIG. 10 is a drawing which shows a method of determining the timing of start modulating the light beam according to the first embodiment. In this embodiment, prior to execution of a latent image forming operation for one line, the light beam scans away from the effective image region IR toward the direction (+X). When the light beam moves passed the scanning position Ph (the scanning angle θh) which corresponds to the optical sensor 60, the optical sensor 60 outputs the first detection signal which will then be fed to the write timing adjuster 103. In response, the write timing adjuster 103 counts the elapsed time since the timing T11 of detection of the first detection signal. Moving passed the optical sensor 60. The light beam (first light beam) is made scan further toward the direction (+X) by the deflecting mirror surface 651, and the deflecting mirror surface 651 reversing itself at the maximum amplitude time Tmax then reverses the scanning direction. The scanning light (second light beam) moves toward the effective image region IR along the direction (−X). When the scanning light moves passed the scanning position Ph (the scanning angle θh), i.e., at the time T12, the optical sensor 60 outputs the second detection signal to the write timing adjuster 103. Receiving this, the write timing adjuster 103 stops counting the elapsed time and calculates the time needed for the light beam to move to the optical sensor 60 and come back from the optical sensor 60, namely, the horizontal synchronization period ta (=T12−T11). The write timing adjuster 103 reads the time th from the memory 104 and calculates the horizontal synchronization stand-by time tw from the following formula:

$$tw=th-ta/2 \quad (1)$$

After the horizontal synchronization stand-by time tw since the second light moved passed the optical sensor 60, the write timing adjuster 103 outputs the horizontal synchronizing signal to the pulse modulator 117. The pulse modulator 117, based on the horizontal synchronizing signal, generates an image signal which is for pulse width modulation of the exposure laser pulse and outputs the image signal to the engine controller 10 via a video interface not shown. Upon receipt of this image signal, the laser driver 102 controls ON/OFF of the laser light source 62 of the exposure unit 6, whereby the light beam is modulated.

As described above, according to the first embodiment, the modulated light beam scans from the direction (+X) to the direction (−X), thereby forming line latent image (unidirectional scan mode). Further, for every scanning cycle of the light beam, the timing of start modulating the light beam is controlled based on a time difference between the first and the second detection signals, namely, the horizontal synchronization period ta. The control of the modulation timing attains adjustment of the write start position for a latent image along the main scanning direction X. Since the write start position for a latent image is adjusted based on the horizontal synchronization period ta which reflects amplitude jitters, the deviation of a latent image along the main scanning direction X attributable to amplitude jitters is suppressed and an image of an excellent quality is formed.

To be noted in particular, according to the first embodiment, a time difference between the first and the second detection signals (the horizontal synchronization period ta) is measured for every scanning. It is possible to control the timing of start modulating the light beam so that write regions in which line latent images will be written will overlap each other about the center-of-scan position of the light beam. Therefore, to obtain the following effect. As shown in FIG. 5, this embodiment requires controlling the timing of start modulating the light beam so that write regions for line latent images will overlap each other about the center-of-scan position of the light beam. Hence, even when the write regions WR expand or shrink along the main scanning direction X due to amplitude jitters, the amounts of deviation attributable to the amplitude jitters (the amplitude jitter value JV) are dispersed on the both sides of the main scanning direction X (the +X side and the −X side) and suppressed low. It is to be particularly noted that when the timing of start modulating the light beam is controlled so that the center of each write region WR will approximately coincide with the center-of-scan position of the light beam, the amounts of deviation attributable to the amplitude jitters become almost equal to each other on the both sides of the main scanning direction and the amounts of deviation are suppressed down to approximately half.

Although the foregoing has described that the horizontal synchronization period ta is measured for every scanning and the horizontal synchronization stand-by time tw is changed, the frequency of exercising this is not limited to this but may be properly modified in accordance of development of amplitude jitters. However, for creation of highly precise image, it is ideal to execute this for every scanning as in the embodiment described above. These equally apply to the later embodiments described below. Meanwhile, as for the method of determining the timing of start modulating the light beam, the method according to the first embodiment is not limiting. This timing may be determined by the following method, utilizing an actually measured time difference between the first and the second detection signals (the horizontal synchronization period) ta which the optical sensor 60 outputs.

Figure 11:
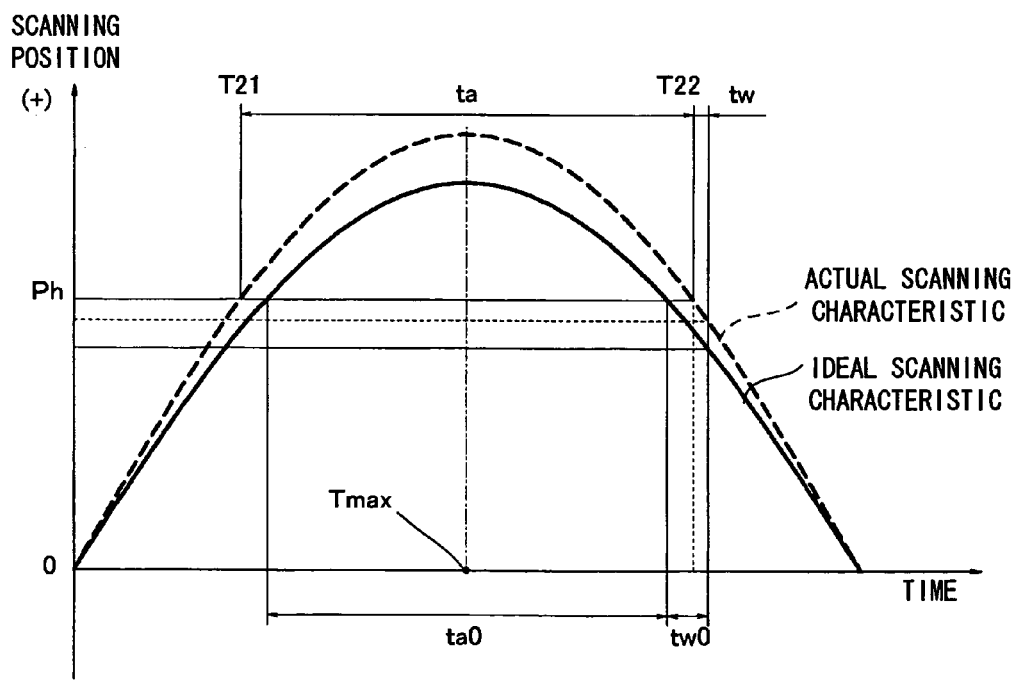
FIG. 11 is a drawing which shows a method of determining the timing of start modulating the light beam according to a second embodiment.

FIG. 11 is a drawing which shows a method of determining the timing of start modulating the light beam according to the second embodiment. This embodiment demands the memory 104 to store, as a standard horizontal synchronization period ta0, a time difference between the first and the second detection signals as they are during scanning with a light beam which exhibits an ideal scanning characteristic (the state of an ideal amplitude) which is denoted at the solid line in FIG. 11. The memory 104 further saves a horizontal synchronization stand-by time corresponding to the standard horizontal synchronization period ta0, as a standard horizontal synchronization stand-by time tw0. The standard horizontal synchronization period ta0 and the standard horizontal synchronization stand-by time tw0 may be set as ta0=54.087 (µs) and tw0=4.913 (µs) for instance as shown in FIG. 8. When an actual scanning characteristic is like the one denoted at the broken line in FIG. 11, the timing of start modulating the light beam is determined in the following fashion. In the process of setting the standard horizontal synchronization period ta0 and the standard horizontal synchronization stand-by time tw0, it is desirable that the formula (ta0/2+tw0=th) is satisfied.

Before execution of the latent image forming operation for one line, the light beam scans away from the effective image region IR along the direction (+X). At the timing T21 that the light beam moves passed the scanning position Ph (the scanning angle θ h) which corresponds to the optical sensor 60, the optical sensor 60 outputs the first detection signal, which is fed to the write timing adjuster 103. In response, the write timing adjuster 103 counts the elapsed time since the detection timing T21. Moving passed the optical sensor 60, the light beam (first light beam) is made scan further toward the direction (+X) by the deflecting mirror surface 651, and the deflecting mirror surface 651 reversing itself at the maximum amplitude time Tmax then reverses the scanning direction. The scanning light (second light beam) moves toward the effective image region IR along the direction (−X). At the timing T22 that the light beam moves passed the scanning position Ph (the scanning angle θ h), the optical sensor 60 outputs the second detection signal to the write timing adjuster 103. Receiving this, the write timing adjuster 103 stops counting the elapsed time and calculates the time needed for the light beam to move to the optical sensor 60 and come back from the optical sensor 60, namely, the horizontal synchronization period ta (=T22−T21). The write timing adjuster 103 reads the period ta0 from the memory 104 and calculates a deviation Δta (=ta−ta0) from the ideal scanning characteristic. The write timing adjuster 103 reads the standard horizontal synchronization stand-by time tw0 from the memory 104 and calculates the horizontal synchronization stand-by time tw by the formula below:

$$tw=tw0-\Delta ta/2 \qquad (2)$$

Following this, as in the first embodiment, after the horizontal synchronization stand-by time tw since the second light beam moved passed the optical sensor 60, the write timing adjuster 103 outputs the horizontal synchronizing signal to the pulse modulator 117. Based on the horizontal synchronizing signal, the timing of start modulating the light beam is controlled, and the write start position is adjusted accordingly.

Although the second embodiment described above requires substituting the deviation Δta in the horizontal synchronization period and the standard horizontal synchronization stand-by time tw0 in the formula (2) above and accordingly calculating the horizontal synchronization stand-by time tw, the standard horizontal synchronization stand-by time tw may be adjusted using a data table as that shown in FIG. 12 for example. According to the third embodiment, the memory 104 stores, in the format of a data table, a horizontal synchronization stand-by time tw which is determined by a combination of the deviation Δta in the horizontal synchronization period and an offset value ΔL. The offset values ΔL in this data table are numerical values which are for finely adjusting the write start position along the main scanning direction to deal with color deviation, etc. The offset values ΔL are set before the start of printing and not changed during printing.

As the deviation Δta in the horizontal synchronization period is calculated for every scanning cycle of the light beam in a similar manner to that according to the second embodiment, the corresponding horizontal synchronization stand-by time tw is read with reference to the data table inside the memory 104. For instance, in the event that the offset value ΔL is set to "−100" for the purpose of adjustment of color deviation, the horizontal synchronization stand-by time tw is:

$$tw=4.878 \text{ for } -30(ns)$$

$$tw=4.883 \text{ for } -20(ns)$$

Further, as in the embodiments above, after the horizontal synchronization stand-by time tw since the second light beam moved passed the optical sensor 60, the write timing adjuster 103 outputs the horizontal synchronizing signal to the pulse modulator 117. Based on the horizontal synchronizing signal, the timing of start modulating the light beam is controlled, and the write start position is adjusted accordingly.

The third embodiment requires using the data table (FIG. 12) in which the horizontal synchronization stand-by times tw are set in association with combinations of the deviations Δta in the horizontal synchronization period and the offset values ΔL. Another table may be used. For instance, a data table may be used instead in which horizontal synchronization stand-by times tw are set in association with combination of horizontal synchronization periods ta and offset values ΔL. In short, According to the fourth embodiment, the memory 104 stores, in the format of a data table, a horizontal synchronization stand-by time tw which is determined by a combination of a horizontal synchronization period ta and an offset value ΔL as shown in FIG. 13 for example. As the horizontal synchronization period ta is calculated as in the first embodiment, the corresponding horizontal synchronization stand-by time tw is read with reference to the data table inside the memory 104. Further, as in the embodiments above, after the horizontal synchronization stand-by time tw since the second light beam moved passed the optical sensor 60, the write timing adjuster 103 outputs the horizontal synchronizing signal to the pulse modulator 117. Based on the horizontal synchronizing signal, the timing of start modulating the light beam is controlled, and the write start position is adjusted accordingly.

The horizontal synchronization stand-by time tw is changed and the write start position is adjusted using a data table in the third and the fourth embodiments. Hence, the third and the fourth embodiments demand less calculations than in the first and the second embodiments and reduce a control-purpose load upon the write timing adjuster 103. In addition, it is possible to further improve the scanning speed. Moreover, according to the third and the fourth embodiments, association with the offset values ΔL realizes adjustment of color deviation and suppression of deviations caused by amplitude jitters, which attains creation of a color image of a high quality.

Figure 14:
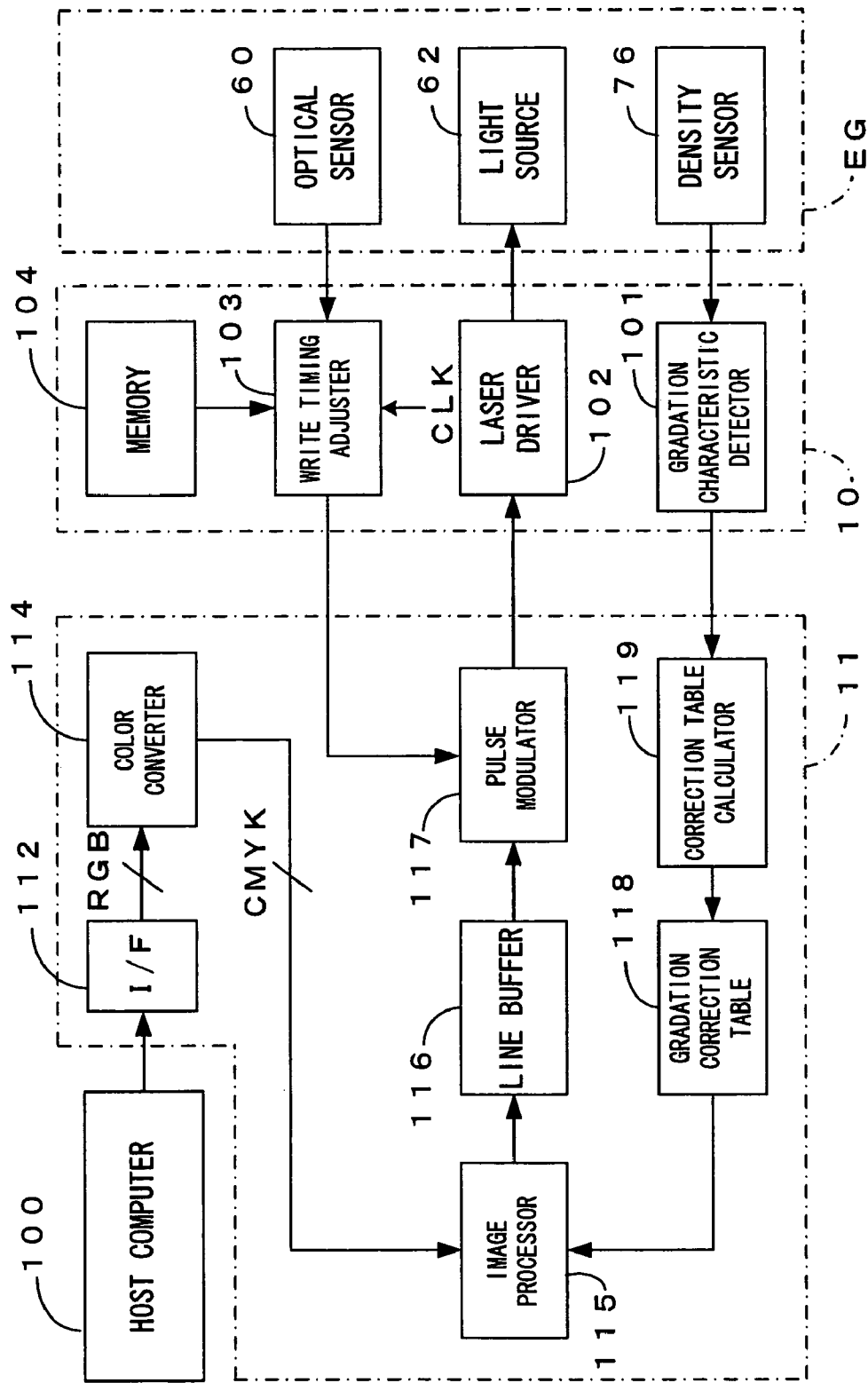
FIG. 14 is a drawing of an image forming apparatus according to a fifth embodiment of the invention.

FIG. 14 is a drawing of an image forming apparatus according to the fifth embodiment of the invention. FIG. 15 is a flow chart which shows a method of determining the timing of start modulating a light beam according to the fifth embodiment. A major difference of the fifth embodiment from the first embodiment is that a clock generator (not shown) which is for determining the modulation start timing is disposed to the engine controller 10 and that the timing of start modulating the light beam is determined based on a clock signal CLK received from the clock generator. The clock signal CLK may be a clock signal whose clock frequency is 500 MHz for instance.

Figure 16:
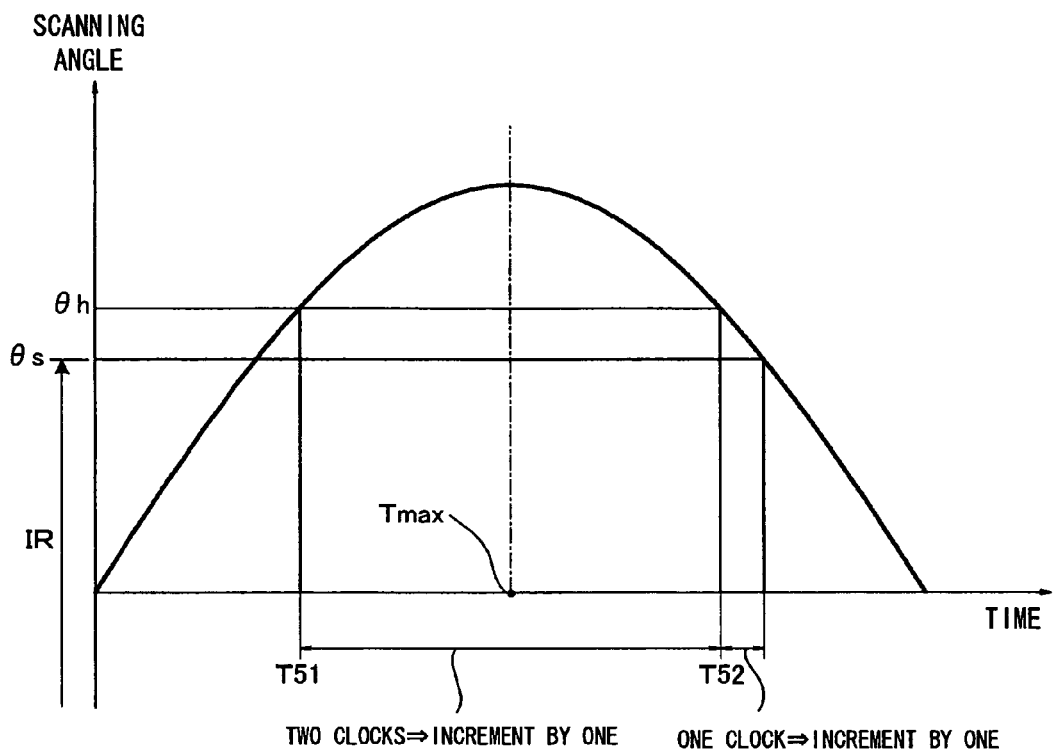
FIG. 16 is a drawing which shows the method of determining the timing of start modulating a light beam according to the fifth embodiment.

The write timing adjuster 103 which receives the clock signal CLK counts in accordance with an operation flow which is shown in FIG. 15. When the count reaches a predetermined count value (which is 29500 in the fifth embodiment), the write timing adjuster 103 outputs the horizontal synchronizing signal to the pulse modulator 117, whereby the write start position is adjusted. In other words, the counter is reset prior to execution of the latent image forming operation for one line (Step 1). The light beam scans away from the effective image region IR along the direction (+X). At the timing T51 that the light beam moves passed the scanning position Ph (the scanning angle θ h) which corresponds to the optical sensor 60, the optical sensor 60 outputs the first detection signal which will be then fed to the write timing adjuster 103 as shown in FIG. 16. In response, the write timing adjuster 103 starts counting based on the clock signal CLK. However, at this stage, the write timing adjuster 103 increments the count only by one for every two clocks of the clock signal CLK (Step S3).

While counting is repeated in this manner, the light beam (first light beam) moving passed the optical sensor 60 is made scan further toward the direction (+X) by the deflecting mirror surface 651, and the deflecting mirror surface 651 reversing itself at the maximum amplitude time Tmax then reverses the scanning direction. The scanning light (second light beam) moves toward the effective image region IR along the direction (−X). At the timing T52 that the light beam moves passed the scanning position Ph (the scanning angle θ h), the optical sensor 60 outputs the second detection signal to the write timing adjuster 103 (Step S4). Receiving this, the write timing adjuster 103 modifies its counting rule. Describing in more specific details, the write timing adjuster 103 increments the count only by one for every clock of the clock signal CLK (Step S5). This counting operation under this counting rule continues until the count reaches a predetermined count value (which is 29500). The predetermined count value may be a numerical value which corresponds to the time th.

Meanwhile, when it is confirmed at Step S6 that the count has reached the predetermined count value, the write timing adjuster 103 outputs the horizontal synchronizing signal to the pulse modulator 117. Writing then starts based on the horizontal synchronizing signal (Step S7). The timing of start modulating the light beam is thus controlled based on the count, and the write start position is adjusted accordingly.

While the fifth embodiment requires determining the timing of start modulating the light beam using the clock signal CLK as described above, the basic technical concept is similar to that is behind the earlier embodiments, and so are basic effects. The fifth embodiment nevertheless promises unique effects: The timing of start modulating the light beam is determined based on the count. Therefore, complicated calculations are not necessary and therefore the processing speed increases. Furthermore, the memory capacity of the memory 104 can be saved as it is not necessary to store a data table in the memory 104.

The counting rule is not limited to that according to the fifth embodiment but rather may be any rule whose latter half rule is the half of the first half rule. That is, the modification may be that counting starts under the counting rule which requires incrementing the count by one for every 2N clocks (where N is a natural number) of the clock signal CLK upon outputting of the first detection signal at Step S2, but upon outputting of the second detection signal at Step S4, then requires incrementing by one for every N clocks of the clock signal CLK.

The first through the fifth embodiments above are directed to printing in what is called "the unidirectional scan mode" in which a modulated light beam scans from the direction (+X) to the direction (−X) and a line latent image is formed. The invention is applicable also to an image forming apparatus which prints in the so-called reciprocal scan mode. The sixth embodiment of the invention will now be described in detail with reference to FIGS. 17 through 20.

Figure 17:
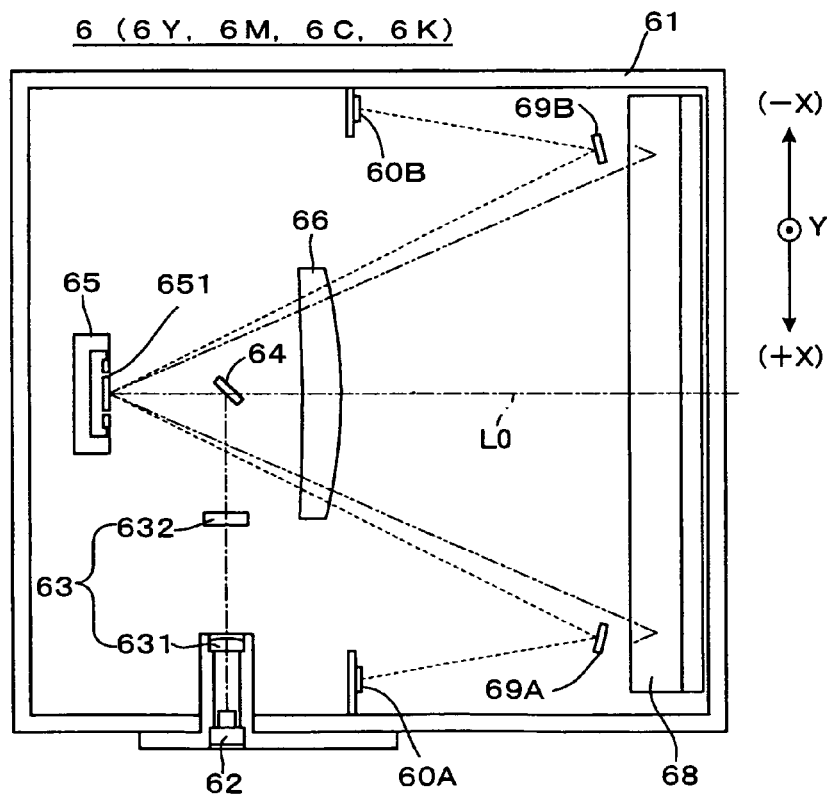
FIG. 17 is a drawing which shows an exposure unit in an image forming apparatus according to a sixth embodiment of the invention.
Figure 18:
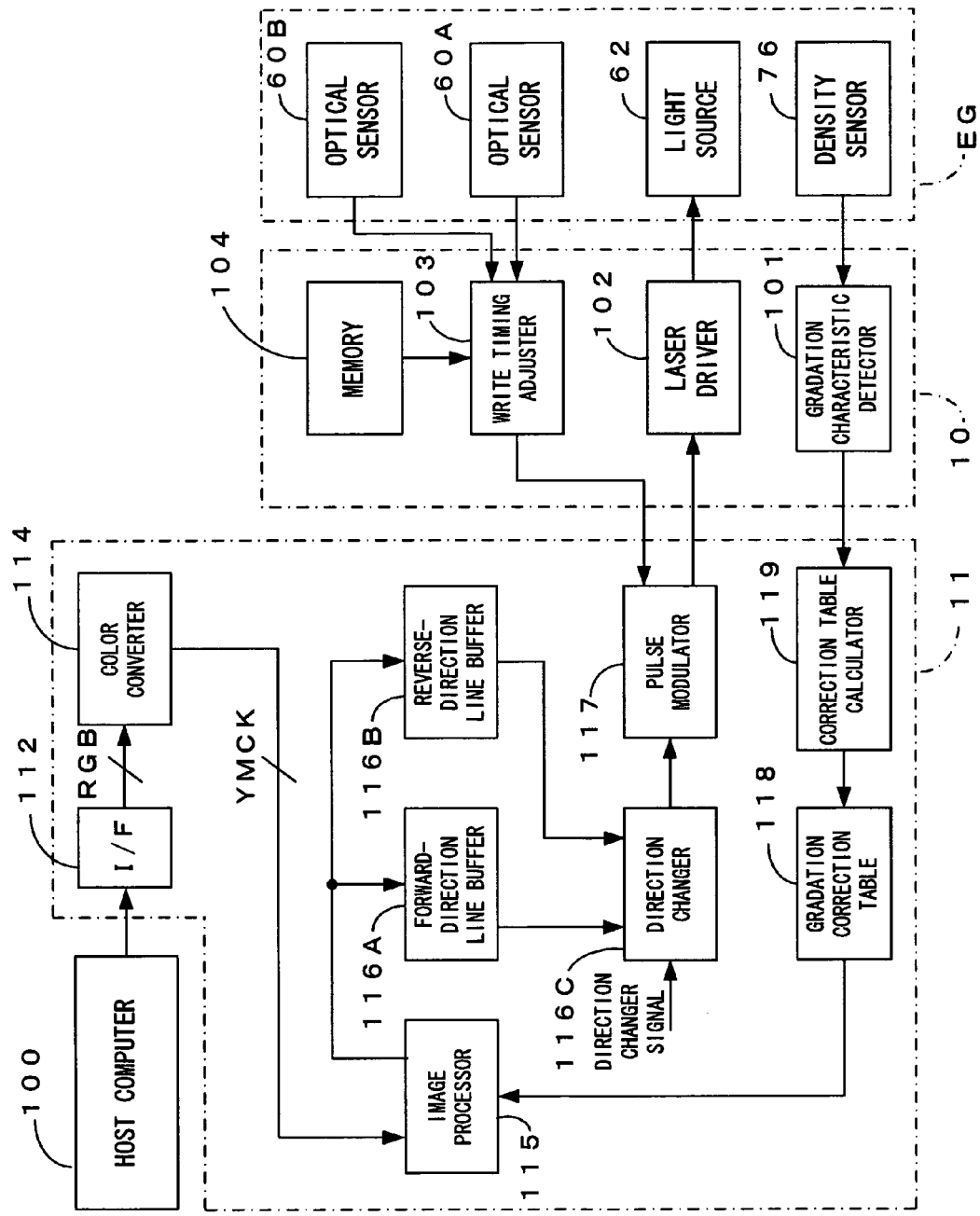
FIG. 18 is a block diagram of an electric structure related to writing of an image in the sixth embodiment.

FIG. 17 is a drawing which shows an exposure unit in an image forming apparatus according to the sixth embodiment of the invention. FIG. 18 is a block diagram of an electric structure related to writing of an image in the sixth embodiment. A major difference of the sixth embodiment from the first embodiment is: that two types of line buffers 116A and 116B are disposed for onward scanning and return scanning; and that optical sensors 60A and 60B are disposed on the both sides of the main scanning direction X. The structure of the apparatus will now be described, while primarily focusing on the difference.

In this apparatus, as shown in FIG. 17, return mirrors 69A and 69B guide the scanning light beam back to the optical sensors 60A and 60B at the ends of the scanning routes of the scanning light beam. The return mirrors 69A and 69B are located at the both ends of the second scan region SR2, and guide back to the optical sensors 60A and 60B the scanning light beam which moves outside the first scan region SR1 within the second scan region SR2. When the optical sensors 60A and 60B receive the scanning light beam and the scanning light beam moves passed the sensor locations Ph (the scanning angles θ h), the optical sensors 60A and 60B output a signal to the pulse modulator 117. In addition, the return mirrors 69A and 69B are arranged approximately symmetric with respect to the optical axis L0 for scanning with the light beam approximately over the center of the effective image region IR. This can generally be construed as approximately symmetric arrangement of the optical sensors 60A and 60B with respect to the optical axis L0.

As one feature regarding the sixth embodiment, the two types of line buffers 116A and 116B are disposed as shown in FIG. 18. The line buffers 116A and 116B, although having commonality in that they store halftone gradation data (image information) which constitute 1-line image data which the image processor 115 outputs, read gradation data in different orders from each other. In other words, while the forward-direction line buffer 116A outputs halftone gradation data which constitute 1-line image data from the top in the forward direction, the reverse-direction line buffer 116B outputs from the last in the reverse direction.

The halftone gradation data output in this manner are fed to a direction changer 116C, and at appropriate timing, the direction changer 116C outputs to the pulse modulator 117 only the halftone gradation data output from one of the line buffers based on a direction change signal. In short, the direction changer 116C provides the pulse modulator 117 with the gradation data at the timing and in the order corresponding to each color component. Receiving the gradation data, the pulse modulator 117 generates an image signal which is for pulse width modulation of the exposure laser pulse for an image of each color within the engine section EG, and outputs the image signal to the engine controller 10 via a video interface not shown. Upon receipt of this image signal, the laser driver 102 controls ON/OFF of the laser light source 62 of the exposure unit 6, whereby the light beam is modulated.

Further, the apparatus having the structure above is capable of reciprocally sweeping a light beam along the main scanning direction X, i.e., along both the direction (+X) and the direction (−X). As described above, gradation data which constitute 1-line image data are temporarily stored in a storage section (line buffers 116A and 116B), and the direction changer 116C provides the pulse modulator 117 with the gradation data at proper timing and in an appropriate order. For instance, upon switching toward the direction (+X), as shown in FIG. 19A, gradation data are read in the order of DT1, DT2, . . . DTn from the line buffer 116A, beam spots are irradiated upon the photosensitive member 2 along a first direction (+X) based on the respective pieces of gradation data, and a line latent image LI(+X) is formed. On the contrary, upon switching toward the direction (−X), as shown in FIG. 19B, gradation data are read in the order of DTn, DT(n−1), . . . DT1 from the line buffer 116B, beam spots are irradiated upon the photosensitive member 2 along a second direction (−X) based on the respective pieces of gradation data, and a line latent image LI(−X) is formed.

Figure 20:
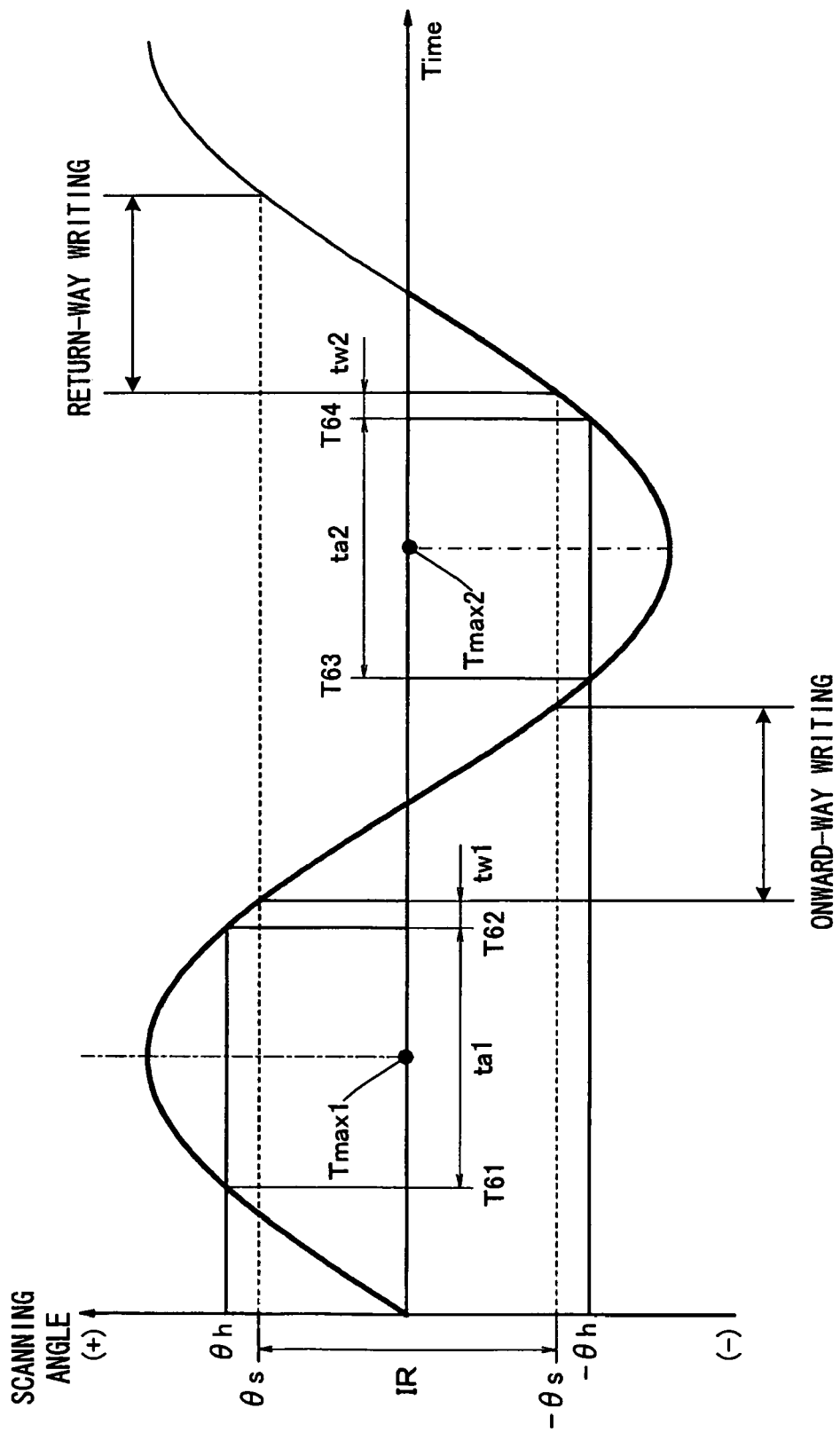
FIG. 20 is a drawing which shows a method of determining the timing of start modulating a light beam according to the sixth embodiment.

As described above, onward-way writing and return-way writing can take place alternately according to the sixth embodiment. Furthermore, during each one of onward-way writing and return-way writing, the timing of start modulating the light beam may be controlled and the write start position may be adjusted in a similar manner to those according to the first through the fifth embodiments described earlier. For instance, the timing of start modulating the light beam may be determined as in the first embodiment. In short, as shown in FIG. 20, before execution of onward-way writing to write one line, a light beam scans away from the effective image region IR along the direction (+X). As the light beam moves passed the scanning position Ph (the scanning angle θ h) which corresponds to the optical sensor 60A (i.e., at the timing T61), the optical sensor 60A outputs the first detection signal which will be then fed to the write timing adjuster 103. In response, the write timing adjuster 103 counts the elapsed time since the timing T61 of detection of the first detection signal. Moving passed the optical sensor 60A, the light beam (first light beam) is made scan further toward the direction (+X) by the deflecting mirror surface 651, and the deflecting mirror surface 651 reversing itself at a maximum amplitude time Tmax1 then reverses the scanning direction. The scanning light (second light beam) moves toward the effective image region IR along the direction (−X). At the time T62 that the scanning light moves passed the scanning position Ph (the scanning angle θ h), the optical sensor 60A outputs the second detection signal to the write timing adjuster 103. Receiving this, the write timing adjuster 103 stops counting the elapsed time and calculates the time needed for the light beam to move to the optical sensor 60A and come back from the optical sensor 60A, namely, a horizontal synchronization period ta1 (=T62−T61). The write timing adjuster 103 reads the time th from the memory 104 and calculates a horizontal synchronization stand-by time tw1 from the following formula:

$$tw1 = th - ta1/2 \quad (3)$$

After the horizontal synchronization stand-by time tw1 since the second light moved passed the optical sensor 60A, the write timing adjuster 103 outputs the horizontal synchronizing signal to the pulse modulator 117. The pulse modulator 117, based on the horizontal synchronizing signal, generates an image signal which is for pulse width modulation of the exposure laser pulse and outputs the image signal to the engine controller 10 via a video interface not shown. Upon receipt of this image signal, the laser driver 102 controls ON/OFF of the laser light source 62 of the exposure unit 6, whereby the light beam is modulated (onward-way writing).

Upon completion of onward-way writing, before execution of return-way writing, the light beam scans away from the effective image region IR along the direction (−X). As the light beam moves passed the scanning position −Ph (the scanning angle −θ h) which corresponds to the optical sensor 60B (i.e., at the timing T63), the optical sensor 60B outputs the first detection signal which will be then fed to the write timing adjuster 103. In response, the write timing adjuster 103 counts the elapsed time since the timing T63 of detection of the first detection signal. Moving passed the optical sensor 60B, the light beam (first light beam) is made scan further toward the direction (−X) by the deflecting mirror surface 651, and the deflecting mirror surface 651 reversing itself at a maximum amplitude time Tmax2 then reverses the scanning direction. The scanning light (second light beam) moves toward the effective image region IR along the direction (+X). At the time T64 that the scanning light moves passed the scanning position −Ph (the scanning angle −θ h), the optical sensor 60B outputs the second detection signal to the write timing adjuster 103. Receiving this, the write timing adjuster 103 stops counting the elapsed time and calculates the time needed for the light beam to move to the optical sensor 60B and come back from the optical sensor 60B, namely, a horizontal synchronization period ta2 (=T64−T63). The write timing adjuster 103 reads the time th from the memory 104 and calculates a horizontal synchronization stand-by time tw2 from the following formula:

$$tw2 = th - ta2/2 \quad (4)$$

After the horizontal synchronization stand-by time tw2 since the second light moved passed the optical sensor 60B, the write timing adjuster 103 outputs the horizontal synchronizing signal to the pulse modulator 117. The pulse modulator 117, based on the horizontal synchronizing signal, generates an image signal which is for pulse width modulation of the exposure laser pulse and outputs the image signal to the engine controller 10 via a video interface not shown. Upon receipt of this image signal, the laser driver 102 controls ON/OFF of the laser light source 62 of the exposure unit 6, whereby the light beam is modulated (return-way writing).

As described above, in the reciprocal scan mode as well, as in the first embodiment, for every scanning (during each one of onward-way writing and return-way writing), the timing of start modulating the light beam is controlled based on a time difference between the first and the second detection signals, namely, the horizontal synchronization periods ta1 and ta2 which are from outputting of the first detection signal to outputting of the second detection signal. Accordingly, the write start position for start writing a latent image along the main scanning direction X is adjusted. It is thus possible to form a high-quality image during each one of onward-way writing and return-way writing.

The invention is not limited to the embodiments described above but may be modified in various manners in addition to the embodiments above, to the extent not deviating from the object of the invention. For instance, although the embodiments above are directed to an application of the invention to an image forming apparatus in which after forming a color image temporarily on an intermediate transfer medium such as an intermediate transfer belt, the color image is transferred onto a sheet S, the invention is applicable also to an apparatus which superimposes toner images over each other directly on a sheet and forms a color image.

Further, although the deflecting mirror surface 651 which oscillates is formed using a micromachining technique in the embodiments above, a method of forming the deflection mirror surface is not limited to this. The invention is generally applicable to any image forming apparatus in which a deflection mirror surface exhibiting the amplitude jitter characteristic shown in FIG. 4 deflects a light beam and makes the light beam scan over a latent image carrier.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. An image forming apparatus, comprising:
    a latent image carrier that includes an effective image region which has a predetermined width along a main scanning direction;
    a latent image forming unit that has a structure in which a deflection mirror surface makes a light beam scan in a second scan region which is wider than a first scan region which corresponds to the effective image region, that modulates the light beam in accordance with an image signal within the range of the first scan region for every scanning cycle, and that guides the modulated light beam onto the effective image region, thereby forming a line latent image which corresponds to the image signal;
    an optical sensor that detects a scanning light beam, which moves outside the first scan region within the second scan region, to output a signal; and
    a write timing adjuster that controls the timing of start modulating the light beam and accordingly adjusts a write start position for start writing a latent image along the main scanning direction, based on a time difference between a first detection signal, which the optical sensor outputs as a first light beam scanning away from the effective image region moves passed the optical sensor, and a second detection signal, which the optical sensor outputs after outputting the first detection signal when a second light beam scanning toward the effective image region moves passed the optical sensor.

2. The image forming apparatus of claim 1, wherein the write timing adjuster controls the timing of start modulating the light beam so that a write region in which a line latent image will be written in each scanning cycle will overlap with each other about a center-of-scan position of the light beam.

3. The image forming apparatus of claim 2, wherein the write timing adjuster controls the timing of start modulating the light beam so that the center of each write region will approximately coincide with the center-of-scan position of the light beam.

4. The image forming apparatus of claim 1, wherein the write timing adjuster uses, as the timing of start modulating the light beam, a point of time which is after a predetermined time th since a maximum amplitude time Tmax at which the amplitude of the light beam is the maximum.

5. The image forming apparatus of claim 4, wherein the timing of start modulating the light beam is a point of time which is after a stand-by time tw since outputting of the second detection signal, and
    the write timing adjuster calculates a time difference ta between the first and the second detection signals for every scanning cycle of the light beam and changes the stand-by time tw based on the formula below:

$$tw = th - ta/2.$$

6. The image forming apparatus of claim 4, further comprising a memory, wherein
    the timing of start modulating the light beam is a point of time which is after a stand-by time tw since outputting of the second detection signal,
    the memory stores in advance a time difference ta0 between the first and the second detection signals and a stand-by time tw0 which satisfies the formula below as standard values:

$$ta0/2 + tw0 = th$$

and for every scanning cycle of the light beam, the write timing adjuster calculates a deviation $\Delta ta$ of a time difference ta between the first and the second detection signals from the time difference ta0, and changes the stand-by time tw based on the formula below:

$$tw = tw0 - \Delta ta/2.$$

7. The image forming apparatus of claim 4, further comprising a memory, wherein
    the timing of start modulating the light beam is a point of time which is after a stand-by time tw since outputting of the second detection signal,
    the memory stores in advance a time difference ta0 between the first and the second detection signals as a standard value and also stores a data table which expresses how the deviation $\Delta ta$ of a time difference ta between the first and the second detection signals from the standard value ta0 is related to the stand-by time tw, and
    for every scanning cycle of the light beam, the write timing adjuster calculates the deviation $\Delta ta$ of the time difference ta between the first and the second detection signals from the standard value ta0, reads the stand-by time tw corresponding to the deviation $\Delta ta$ from the data table, and changes the stand-by time tw.

8. The image forming apparatus of claim 4, further comprising a memory, wherein
    the timing of start modulating the light beam is a point of time which is after a stand-by time tw since outputting of the second detection signal,
    the memory stores a data table which expresses how a time difference ta between the first and the second detection signals is related to the stand-by time tw, and
    for every scanning cycle of the light beam, the write timing adjuster calculates the time difference ta between the first and the second detection signals, reads the stand-by time tw corresponding to the time difference ta from the data table, and changes the stand-by time tw.

9. The image forming apparatus of claim 4, wherein the write timing adjuster is provided with a clock signal,
  upon outputting of the first detection signal, the write timing adjuster starts counting in accordance with a counting rule which requires incrementing a count by one for every 2N clocks (where N is a natural number) of the clock signal, whereas upon outputting of the second detection signal, the write timing adjuster changes to a counting rule which requires incrementing a count by one for every N clocks of the clock signal, and
  the timing of start modulating the light beam is a point of time at which a total count reaches a value which corresponds to the predetermined time th.

10. The image forming apparatus of claim 1, wherein the latent image forming element makes the light beam scan, using the deflection mirror surface which exhibits an amplitude jitter characteristic that the maximum amplitude time, at which the amplitude is the largest, and an amplitude zero time, at which the amplitude becomes zero, remain approximately constant independently of a change of the maximum amplitude value of the deflection mirror surface.

11. The image forming apparatus of claim 1, wherein the first scan region is located approximately in a central portion of the second scan region, and
  the optical sensor is disposed in at least one of the both end portions of the second scan region.

12. The image forming apparatus of claim 1, wherein the deflection mirror surface resonates.

13. An image forming method for use in an image forming apparatus which comprises a latent image carrier that includes an effective image region which has a predetermined width along a main scanning direction, and a latent image forming unit that has a structure in which a deflection mirror surface makes a light beam scan in a second scan region which is wider than a first scan region which corresponds to the effective image region, that modulates the light beam in accordance with an image signal within the range of the first scan region for every scanning cycle, and that guides the modulated light beam onto the effective image region, thereby forming a line latent image which corresponds to the image signal, the image forming method comprising:
  making an optical sensor detect a first light beam which scans and moves away from the effective image region;
  making a second light beam scan and move toward the effective image region after the first light beam, as a result of inversion of the deflection mirror surface;
  making the optical sensor detect the second light beam;
  calculating the elapsed time since detection of the first light beam until detection of the second light beam; and
  controlling the timing of start modulating the second light beam based on the elapsed time, thereby adjusting a write start position for start writing a latent image along the main scanning direction.

* * * * *